(12) United States Patent
Gobin et al.

(10) Patent No.: US 11,208,511 B2
(45) Date of Patent: Dec. 28, 2021

(54) NON-RANDOM ISOBUTYLENE COPOLYMERS

(71) Applicant: TPC Group LLC, Houston, TX (US)

(72) Inventors: André M. Gobin, Pearland, TX (US); Rajeev Kumar, Houston, TX (US); George Pappas, Galveston, TX (US); James A. Hopson, Humble, TX (US); Michael O. Nutt, Pearland, TX (US); Peggy J. Macatangay, League City, TX (US); Randall V. Redd, Spring, TX (US)

(73) Assignee: TPC Group LLC, Houston, TX (US)

( * ) Notice: Subject to any disclaimer, the term of this patent is extended or adjusted under 35 U.S.C. 154(b) by 109 days.

(21) Appl. No.: 16/648,580

(22) PCT Filed: Oct. 12, 2018

(86) PCT No.: PCT/US2018/055652
§ 371 (c)(1),
(2) Date: Mar. 18, 2020

(87) PCT Pub. No.: WO2019/075356
PCT Pub. Date: Apr. 18, 2019

(65) Prior Publication Data
US 2021/0301048 A1    Sep. 30, 2021

Related U.S. Application Data

(60) Provisional application No. 62/572,440, filed on Oct. 14, 2017.

(51) Int. Cl.
*C08F 210/12*    (2006.01)
*C08F 2/01*    (2006.01)
(Continued)

(52) U.S. Cl.
CPC ............ *C08F 210/12* (2013.01); *C08F 2/001* (2013.01); *C08F 2/01* (2013.01); *C08F 4/14* (2013.01); *C08F 212/08* (2013.01); *C08F 236/08* (2013.01)

(58) Field of Classification Search
USPC .......................................... 526/65, 339, 347
See application file for complete search history.

(56) References Cited

U.S. PATENT DOCUMENTS 3,288,735 A    11/1966    Watanabe et al.
3,438,804 A    4/1969    Berger
(Continued)

FOREIGN PATENT DOCUMENTS

CN    103387628 A    11/2013
EP    1242464 B    4/2011
(Continued)

OTHER PUBLICATIONS

Indian Examination Report in counterpart U.S. application dated Sep. 10, 2021.
(Continued)

*Primary Examiner* — Fred M Teskin
(74) *Attorney, Agent, or Firm* — Michael Ferrell

(57) ABSTRACT

Non-random isobutylene copolymer includes repeat units derived from isobutylene and one or more comonomers selected from isoprene, butadiene, cyclopentadiene, dicyclopentadiene, limonene, substituted styrenes, and C4 to C10 dienes other than isoprene, butadiene, limonene, cyclopentadiene, or dicyclopentadiene, wherein the molar ratio of isobutylene derived repeat units to the comonomer derived repeat units is from 75:1 to 1.5:1. The non-random copolymers have a molecular weight, Mn, of from 200 to 20,000

(Continued)

Daltons and typically have a high double bond content and a high vinylidene double bond content when diene monomers are utilized.

20 Claims, 8 Drawing Sheets

(51) Int. Cl.

| | | |
|---|---|---|
| *C08F 212/08* | (2006.01) | |
| *C08F 212/12* | (2006.01) | |
| *C08F 4/14* | (2006.01) | |
| *C08F 236/06* | (2006.01) | |
| *C08F 236/08* | (2006.01) | |
| *C08F 2/00* | (2006.01) | |

(56) References Cited

U.S. PATENT DOCUMENTS

| | | | |
|---|---|---|---|
| 3,948,868 | A | 4/1976 | Powers |
| 4,153,773 | A * | 5/1979 | Buckley ............ C08F 210/12 526/308 |
| 4,207,142 | A | 6/1980 | Shepherd |
| 4,465,829 | A | 8/1984 | Graves |
| 4,698,411 | A | 10/1987 | Hill et al. |
| 5,124,484 | A | 6/1992 | Brown et al. |
| 5,556,932 | A | 9/1996 | Rath et al. |
| 5,663,457 | A | 9/1997 | Kolp |
| 5,725,612 | A | 3/1998 | Malfer et al. |
| 5,962,604 | A | 10/1999 | Rath |
| 6,602,965 | B1 | 8/2003 | Terazawa et al. |
| 6,858,188 | B2 | 2/2005 | Rxter, Jr. et al. |
| 6,899,852 | B2 | 5/2005 | Conck |
| 7,067,594 | B2 | 6/2006 | Kolp |
| 7,291,758 | B2 | 11/2007 | Bohnenpoll et al. |
| 7,388,033 | B2 | 6/2008 | Nagy et al. |
| 7,750,089 | B2 | 7/2010 | Kolp et al. |
| 8,492,489 | B2 | 7/2013 | Fouarge et al. |
| 8,710,147 | B2 | 4/2014 | Cherpeck et al. |
| 8,791,216 | B2 | 7/2014 | Baxter, Jr. |
| 8,816,028 | B2 | 8/2014 | Baxter, Jr. |
| 9,309,339 | B2 | 4/2016 | Shaikh |
| 9,617,366 | B1 | 4/2017 | Gobin et al. |
| 9,752,020 | B2 | 9/2017 | Wang et al. |
| 2007/0068070 | A1 | 3/2007 | Jackson et al. |
| 2010/0298507 | A1 | 11/2010 | Menschig et al. |
| 2012/0000118 | A1 | 1/2012 | Lange et al. |
| 2015/0079323 | A1 | 3/2015 | Abad et al. |

FOREIGN PATENT DOCUMENTS

| | | |
|---|---|---|
| JP | 2011080084 A | 4/2011 |
| WO | 2004058825 A2 | 7/2004 |

OTHER PUBLICATIONS

Extended European Search Report in counterpart U.S. application dated Sep. 20, 2021.
International Preliminary Report on Patentability dated Feb. 27, 2020.
Allen Noshay & James McGrath, Block Copolymers Overview and critical Survey, NY, 1977, Chapter 5 (Di-Block Copolymers), p. 92.
Kraus, Childers & Gruver, Journal of Applied Polymer Science, 11, 1581 (1967).
Angelo, Ikeda & Wallach, Polymer, 6,141 (1965).
Journal of Macromolecular Science, Part A: Pure and Applied Chemistry, 32:11, 1809-1830 (1995).

\* cited by examiner

— LINEAR FIT  SLOPE= 0.0054

— LINEAR FIT  SLOPE= 0.0099

NON-RANDOM ISOBUTYLENE COPOLYMERS

CROSS REFERENCE TO RELATED APPLICATIONS

This application is based on International Application No. PCT/US2018/055652 filed Oct. 12, 2018 which claimed priority to U.S. Provisional Patent Application No. 62/572,440, filed Oct. 14, 2017. The priorities of the foregoing applications is hereby claimed and their disclosures incorporated herein by reference.

TECHNICAL FIELD

The present invention relates to isobutylene copolymers with other unsaturated comonomers such as isoprene, styrene and the like, methods of making the copolymers and end-uses thereof.

BACKGROUND

There is disclosed in U.S. Pat. No. 5,556,932 (BASF) isobutylene/diene copolymers with at least 60% vinylidene groups. This reference relates to isobutylene/butadiene copolymers for the most part. Example 9, Col. 9, includes a reactant mixture of C5s including isoprene, pentadienes and cyclopentadienes. Conversions of the various diene monomers in Example 9 are not reported. Reaction is carried out in a loop reactor with the reactants in hexane solvent (1:1) at −10° C.

U.S. Pat. No. 7,291,758 (BASF) discloses a process for making isobutylene/isoprene copolymers with an Mn of 2,000 or so in an autoclave. Conversions are quite low, particularly where isoprene concentrations exceed about 8%.

U.S. Pat. No. 7,750,089 (Lubrizol) discloses isobutylene/diene copolymers made with chloride catalysts which are derivatized with anhydrides/amines for fuel additives. Examples specify isoprene/isobutylene made in a 1 L continuous reactor at −30° C. See also, U.S. Pat. No. 7,067,594 (Lubrizol) which discloses carboxylated isobutylene/polyene polymers for lubricating oil additives wherein carboxylation is carried out with maleic anhydride. The copolymers of the '594 patent are made with aluminum trichloride catalyst.

It is apparent from the foregoing references that improved methodologies for manufacture of isobutylene copolymers are needed in order to provide for more efficient manufacture and more reactive isobutylene copolymers.

Various methodologies employing multiple reactors and/or multiple injection points for reactants and catalyst have been disclosed for polyolefins. U.S. Pat. No. 8,492,489 (Total Petrochemicals) discloses the use of different feed points to control monomer distribution in ethylene copolymers. U.S. Pat. No. 6,899,852 (Exxon Mobil) calls for injecting both monomer and catalyst at spaced locations in a tubular reactor to provide different reaction zones in a tubular reactor. U.S. Pat. No. 6,602,965 (Kaneka) discloses polymerizing isobutylene homopolymers, copolymers and end-capping using multiple reactors. U.S. Pat. No. 5,962,604 (BASF) relates to polyisobutylene manufacture using a plurality of serially arranged loop reactors; however, copolymers of isobutylene are not referenced.

The copolymers of the present invention are useful in a variety of applications including fuel and lubricating oil additives, rubber compositions and products as well as applications not typically employing polyisobutylenes such as in unsaturated polyester resins, polyurethanes, adhesives, sizings, oxirane derivatives and so forth as is described hereinafter.

The copolymers of the present invention, which are typically chloride-free, can be tailored to the particular end use in terms of molecular weight and functionality to provide superior novel products which are more easily formulated and prepared than traditional products.

SUMMARY OF INVENTION

It has been found in accordance with the present invention that non-random isobutylene copolymers with selective incorporation of comonomers can be prepared in high yield at low reactor residence times. Suitable reactor temperatures are above −30° C. Comonomers used with isobutylene include:

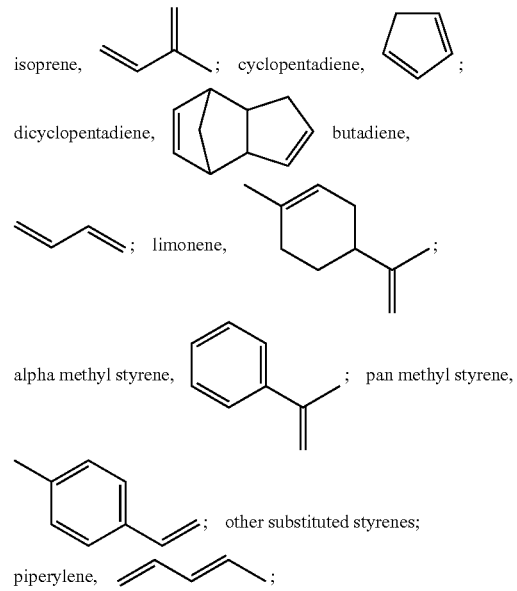

and C4 to C10 dienes other than isoprene, cyclopentadiene, dicyclopentadiene, butadiene and piperylene, as well as like comonomers, such as α-terpenes and β-terpenes. The comonomers may be used in combination if so desired.

The present invention is directed, in one embodiment, to a method of making a non-random isobutylene copolymer comprising: (a) providing a reaction mixture to a first reactor comprising isobutylene monomer as well as a Lewis acid polymerization catalyst; (b) polymerizing the reaction mixture in the first reactor while maintaining the first reactor at a temperature above −30° C. and utilizing a first reactor residence time of less than 45 minutes to polymerize at least 30% of the isobutylene monomer fed to the first reactor to produce an isobutylene prepolymer in a polymerization mixture; (c) feeding the polymerization mixture to a second reactor along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first and second reactors to the comonomer is from 60:1 to 1:1; (d) polymerizing the polymerization mixture and comonomer in the second reactor while maintaining the reactor at a temperature above −30° C. and utilizing a reactor residence time of less than 45 minutes to produce a non-random crude isobutylene copolymer in a copolymerization mixture; and (e) recovering a purified non-random isobutylene copolymer from the copolymerization mixture having a molecular weight, Mn, of from 200 to 20,000 Daltons.

A preferred isobutylene non-random copolymer according to the invention comprises repeat units derived from isobutylene and a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene, and is characterized in that the non-random copolymer exhibits a Tg at least 3.5° C. lower than a like random copolymer polymerized from the same monomer composition.

The copolymers of the present invention are useful in products such as fuel and lubricating oil additives, rubber products, as well as adhesives, sizings, functionalized copolymers, unsaturated polyesters, polyurethanes, oxirane derivatives and so forth as described hereinafter. The copolymers described herein provide enhanced properties in such products, for example, better sizing properties based on multiple succinic anhydride groups per molecule allowing better integration into the paper product and superior sizing properties.

Still further features and advantages of the invention will become apparent from the discussion which follows.

BRIEF DESCRIPTION OF DRAWINGS

The invention is described in detail below with reference to the various Figures, wherein.

DETAILED DESCRIPTION

Figure 1:
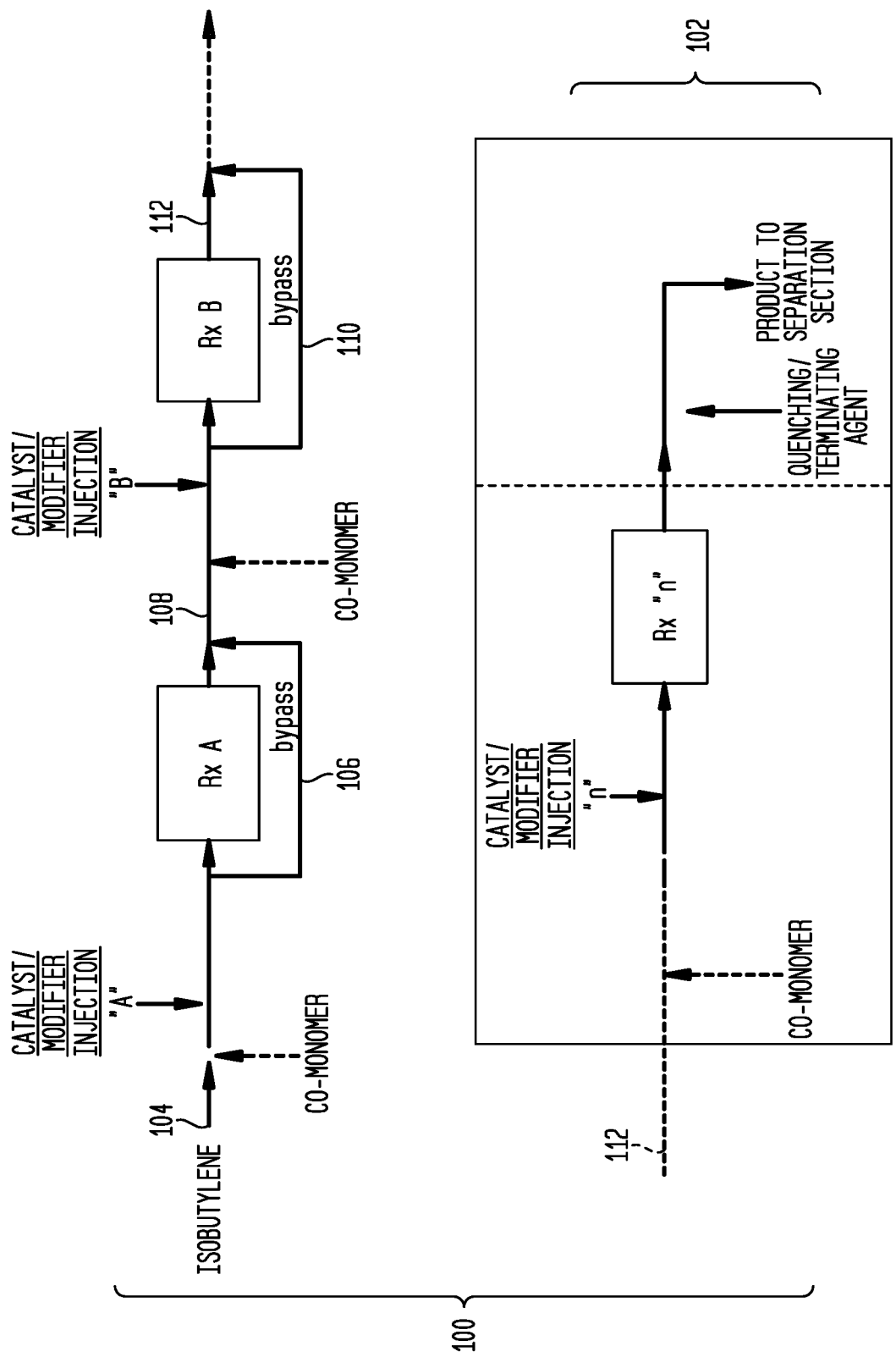
FIG. 1 is a schematic diagram of a system for producing non-random copolymers of the invention with multiple reactors.

The invention is described in detail below with reference to numerous embodiments and numerous examples. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning. Unless otherwise indicated, pressures refer to gauge pressure. Terminology is further defined below and test methods are specified.

Absorptiveness of sized paper is measured using a modified Cobb test (TAPPI Test Method T-441 or equivalent) as described herein.

"Blending" and like terminology refers to intimate mixing of two or more feedstocks and includes simultaneously feeding two feedstocks to a reactor (in situ combination).

"Chloride free" and like terminology refers to compositions with less than 2 ppm chlorine content.

"Consisting essentially of" and like terminology refers to the recited components and excludes other ingredients which would substantially change the basic and novel characteristics of the mixture or composition. Unless otherwise indicated or readily apparent, a composition or mixture consists essentially of the recited components when the composition or mixture includes 95% or more by weight of the recited components. That is, the terminology excludes more than 5% unrecited components.

Conversion of the reaction mixture to polymer is expressed in percent and calculated as the weight (or moles) of monomer incorporated into the copolymer produced less the weight (or moles) of monomer fed to the reaction system divided by the weight (or moles) of monomer fed to the reaction system times 100. Conversion, selectivity and yield are related by the mathematical definition X(conversion)*S(selectivity)=Y(yield), all calculated on either a weight or molar basis; e.g. in a certain reaction, 90% of substance A is converted (consumed), but only 80% of it is converted to the desired substance B and 20% to undesired by-products, so conversion of A is 90%, selectivity for B 80% and yield of substance B is 72% (=90%*80%). For copolymers conversion, selectivity and yield is calculated for each comonomer based on feed and incorporation into the product.

Hydrophobicity index is a measure of relative water repellency as described herein.

Kinematic viscosity of the copolymer products of the invention may be expressed in Cst @100° C. and is preferably measured in accordance with Test Method ASTM D 445.

Molecular weight herein is typically reported as number average molecular weight, Mn, in Daltons, and is measured by Gel Permeation Chromatography (GPC). GPC measurements reported herein were carried out using a Viscotek GPCmax® instrument (Malvern instruments, Worcestershire, UK) employing a 3-column set-up (5 μm (particle size) 100 Angstrom (pore size), 5 μm 500 Angstrom, 5 μm $10^4$ Angstrom) and a Refractive Index (RI) detector. Polyisobutylene standards were used to construct the calibration curve.

Non-random copolymers of the invention may be prepared by selective feeding of monomer and optionally catalyst in a polymerization system with multiple inlets or by supplying a low molecular weight PIB polymer or oligomer to a polymerization system, along with additional monomer and additional catalyst. The differences between random and non-random copolymers may be appreciated by reference to https://en.wikipedia.org/wiki/Living_polymerization, Oct. 1, 2018, wherein it is seen that:

substantially random copolymers have repeating units X, Y randomly occurring in the polymer chain in a sequence such as XYXYXYXXYXYYYXYXX, while a non-random block copolymer may be sequenced XXXXXXXXYYYYYYY and a gradient non-random copolymer may be sequenced XXXXXYXXYYYXYYYYY.

A "non-random" copolymer thus refers to a copolymer composition whose molecules have distinct segments of different monomer residues due to selective polymerization of a monomer feed which differs in composition from polymer segments already reacted. Non-random copolymers can be distinguished from random copolymers by a variety of techniques, including by differential scanning calorimetry since non-random copolymers typically exhibit different melting points and different glass transition temperatures as compared to random copolymers of the same or similar composition. Non-random copolymers thus may have a more localized as well as additional functionality as compared to a random copolymer. In the Examples which follow a gradient copolymer is provided, most similar to a non-random copolymer by definition and differentiable from a random copolymer.

When we compare a non-random copolymer of the invention to a "like random copolymer polymerized from the same monomer composition" we refer to a substantially random copolymer made from a feed having the same overall monomer proportions as a like non-random copolymer and a molecular weight, Mn, within about 400 Daltons. Suitably, the like random copolymer is polymerized with the same molar ratio of catalyst and solvent to reactants, the same reaction temperatures within about 7.5° C., in the same apparatus as the like non-random copolymer using the same overall residence times. The reaction mixture for preparing the like random copolymer from the same monomer composition is fed in its entirety to an initial inlet of the polymerization apparatus, while the corresponding non-random copolymer is polymerized by sequentially introducing different monomer feeds to one or more secondary inlets downstream of the initial feed. Non-random copolymers of the invention typically exhibit a glass transition temperature of at least 3.5° C. lower than a like random copolymer prepared from the same monomer composition.

Polydispersity or PDI is defined as the ratio of the weight average molecular weight divided by the number average molecular weight of the polymer.

"Glass transition temperature" or Tg, of a composition refers to the temperature at which a composition transitions from a glassy state to a viscous or rubbery state. Glass transition temperature may be measured in accordance with ASTM D7426, ASTM D3418 or equivalent procedure as described herein.

"Melting temperature" refers to the crystalline melting temperature of a semi-crystalline composition. Melting temperatures may also be measured in accordance with ASTM D3418 or equivalent procedure.

Copolymers of the invention have significant amounts of alpha vinylidene terminated molecules due to the isobutylene content of the copolymers and their method of manufacture:

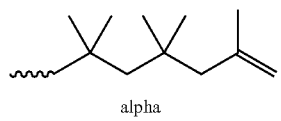

alpha

Reactive end groups present may also include beta olefin isomers (1,1,2-trisubstituted or 1,2,2-trisubstituted cis or trans isomer):

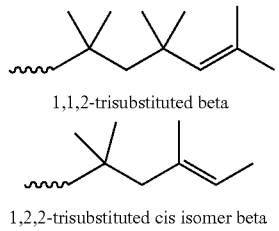

1,1,2-trisubstituted beta 1,2,2-trisubstituted cis isomer beta

Other end group structures which may be present include tetrasubstituted structures, other trisubstituted structures with a double bond in the internal gamma position, structures with other internal double bonds and aliphatic structures, for example:

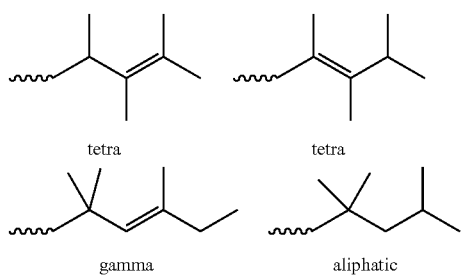

tetra   tetra gamma   aliphatic

The materials of the present invention may be characterized by double bond content based on monomer conversion or direct measurement by $^1$H NMR and $^{13}$C NMR as is seen in White, J. L. et al., Incorporation of Isoprene in Isobutylene/Isoprene Copolymers: NMR Identification of Branching in Butyl Rubber, *Macromolecules* 1995, 28, 3290-3300; Chu, C. Y. et al., Determination of the Structure of Butyl Rubber by NMR Spectroscopy, *Macromolecules* 1985, 18, 1423-1430; Barsan, F. et al., Polymerization of Isobutylene and the Copolymerization of Isobutylene and Isoprene Initiated by the Metallocene Derivative Cp*TiMe$_2$(μ-Me)B(C$_6$F$_5$)$_3$, *Macromolecules*, Vol. 31, No. 24, Dec. 1, 1998; and Tse, C.K.W., Isobutylene Polymerization and Isobutylene-Isoprene Copolymerization Using Cp*TiMe$_3$/B(C$_6$F$_5$)$_3$/Octadecanoic Acid Initiating System, (Thesis) Queens University Kingston Ontario, September 2001.

One sees different structures in the copolymer product, depending upon the comonomer species and the mechanism of addition of comonomer. For example, isobutylene/isoprene copolymer may have one of the following structures depending upon whether the addition of isoprene is a 1,4 or 1,2 or 4,3 addition to the copolymer chain:

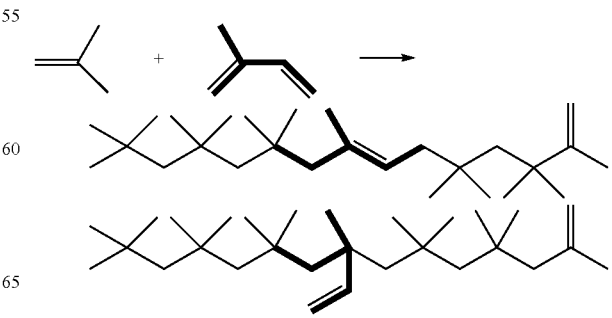

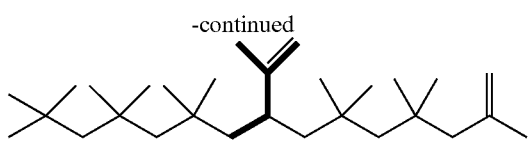

The molecules may have chain ends besides the alpha terminated chains seen above, including beta or tetra structures on the chain ends.

For present purposes, we refer to "vinylidine" double bonds as including alpha vinylidene double bonds and the internal vinylidine double bonds seen in the latter two structures above as well as the "internal alpha" structure referred to in U.S. Pat. No. 8,816,028, entitled Polyisobutylene Composition Having Internal Vinylidene and Process for Preparing the Polyisobutylene Polymer Composition:

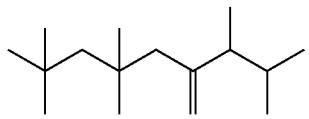 [SMILES: C=C(CC(C)(C)CC(C)(C)C)C(C)C(C)C]

In general, "vinylidene" double bonds thus refer to reactive double bonds in the molecule that are $CH_2$ terminated.

In the examples which follow, the content of vinylidine double bonds was determined based on 1H-NMR spectroscopy in deuterated chloroform as the solvent. The olefinic methine hydrogens of the 1,4 isoprene give the triplet at 5.05 ppm. The olefinic methylene hydrogens from the isoprene show a doublet at 4.93 ppm. The peak at value 4.64 and 4.68 ppm is due to the formation of double bond at the end unit in the chain. Two major isobutyl signals at 1.14 ppm and 1.45 ppm are due to methyl and methylene protons of polyisobutylene units of the isobutylene-isoprene copolymer. Besides these signals there are other signals due to the presence of isoprenyl unit in the copolymer. These signals are reported in the literature noted above.

The improved process of the present invention features the use of Friedel-Crafts or Lewis acid catalysts which are typically complexed with a complexing agent. Many useful Lewis acid catalysts are known to those of ordinary skill in the related art field. In particular, many useful catalysts are described in the patents referenced above. Useful Lewis acid catalysts include, for example, $BF_3$, $AlCl_3$, $TiCl_4$, $BCl_3$, $SnCl_4$ and $FeCl_3$ and the like. The complexing agent for the catalyst, and in particular for the $BF_3$ catalyst, may be any compound containing a lone pair of electrons, such as, for example, an alcohol, an ester or an amine. The complexing agent may be an alcohol, desirably a primary alcohol, preferably a C1-C8 alcohol (such as, for example, methanol, ethanol, propanol, isopropanol, hexyl alcohol and the like) and ideally methanol. For purposes of convenience, "catalyst" refers to a Lewis acid catalyst of the class described above, while "catalyst complex" refers to the Lewis acid catalyst and complexing agent up to a 1:1 molar ratio. When complexing agent is used in a molar excess with respect to the Lewis acid catalyst it is referred to herein as modifier. Preferred Lewis acids which can be used are complexes of Aluminum Trichloride and/or Ethyl Aluminum Dichloride with C1-05 alcohol and/or ether as modifier.

The catalyst employed is most preferably a $BF_3$ catalyst together with a modifier, sometimes referred to as a cocatalyst or complexing agent. The modifier for the $BF_3$ catalyst may be any compound containing a lone pair of electrons, such as, for example, an alcohol, ether, an ester or an amine or mixtures thereof. The alcohol compound used as the cocatalyst may be a primary, secondary or tertiary alcohol having 1 to 8 carbon atoms, such as, for example, methanol, ethanol, isopropanol, n-propanol, isobutanol, t-butanol, hexyl alcohol and the like. The ether compound used as the cocatalyst may be a primary, secondary or tertiary ether having 2 to 8 carbon atoms, such as, for example, dimethyl ether, diethyl ether, diisopropyl ether, methylpropyl ether, methylisopropyl ether, methylethyl ether, methylbutyl ether, methyl-t-butyl ether, ethylpropyl ether, ethylisopropyl ether, ethylbutyl ether, ethylisobutyl ether, ethyl-t-butyl ether and the like. The complexing agent may be added to the reactor, in whole or in part, separately from the $BF_3$ catalyst, or pre-mixed therewith and added to the reactor together with the $BF_3$ catalyst. Likewise, modifier may be added to the reactor separately from the catalyst and complexing agent or pre-mixed therewith and added to the reactor together with the $BF_3$ catalyst and complexing agent.

In one embodiment, the polymerization reaction is carried out in the presence of a catalyst system comprising secondary alkylether, tertiary alcohol, and boron trifluoride, the amount of boron trifluoride is 0.05-1.0 weight part per 100 weight part of monomer, the mole ratio of a co-catalyst including secondary alkylether and tertiary alcohol:boron trifluoride is 1.0-2.0:1, and the mole ratio of secondary alkylether:tertiary alcohol is 0.5-1.2:1.

In many embodiments, the estimated molar ratio of modifier to $BF_3$ in the catalyst composition is generally in the range of from approximately 0.5-3.5 to 1, desirably within the range of from approximately 0.5:1 to approximately 2:1, and in some cases within the range of from approximately 1.5:1 to approximately 1:1. In some cases, the catalyst estimated composition may simply be a 1:1 molar complex of $BF_3$ and alcohol and ether mixtures In other preferred embodiments of the invention, the estimated molar ratio of complexing agent:$BF_3$ in said complex may be approximately 1.3:1.

The temperature in the reaction zone may be maintained at a constant level at a temperature above −10° C. such as −7.5° C. or above or −5° C. or above; suitably 0° C. or above or wherein the reactor is maintained at a temperature of 5° C. or 10° C. or above. Temperatures in the range of above 10° C. to 27.5° C. are typical. The residence time is most preferably 45 minutes or less, such as 20 minutes or less, 15 minutes or less or 10 minutes or less. Suitable pressures may be anywhere from 2-20 bar to maintain a liquid phase.

In some embodiments, it is desirable to use one or more inert diluents such as an alkane (e.g., isobutane, n-butane, hexane and the like).

The products of the invention may be made in system including one or more of a continuous stirred tank reactor (CSTR), a plug flow reactor (PFR) or a loop reactor in a liquid phase process.

The flow characteristics of the reaction mixture are also influenced by temperature in the reactor, molecular weight, monomer and diluent content and so forth as is readily appreciated by one of skill in the art. The flow characteristics of the reaction mixture are thus controlled by feed and catalyst rates, conversion of monomer, mixture composition and the temperatures in the reactor as is seen in the examples which follow The inventive copolymers are produced so that they have a non-random distribution of comonomers using a reaction system with a plurality of reactors as is shown in FIG. 1. In FIG. 1 there is shown a reaction apparatus 100 with a plurality of reactors Rx A, Rx B and optionally additional reactors RX "n". System 100 also is provided with a quenching/recovery section 102 as described below in connection with FIG. 4. System 100 is operated generally as described below in connection with FIGS. 2 and 3 utilizing one or more loop reactors or continuous stirred tank reactors (CSTRs), with split feed to the various reactors. In particular a reaction mixture is provided to Rx A via line 104 comprising isobutylene monomer as well as a Lewis acid polymerization catalyst wherein the reaction mixture is polymerized in Rx A while maintaining the reaction medium in Rx A at a temperature above −30° C. and utilizing a first reactor residence time of less than 45 minutes to polymerize at least 50% of the isobutylene monomer fed to the first reactor to produce an isobutylene prepolymer in a polymerization mixture. Optionally provided is a bypass loop 106.

The polymerization mixture from Rx A is fed to Rx B via line 108 along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first and second reactors to the comonomer is from 60:1 to 1:1. Optionally provided is a second bypass loop 110. In Rx B the polymerization mixture and comonomer are further polymerized while maintaining the reaction medium at a temperature above −30° C. and utilizing a reactor residence time of less than 45 minutes to produce a non-random crude isobutylene copolymer in a copolymerization mixture. Optionally, the copolymerization mixture is fed via line 112 from Rx B to one or more additional reactors RX "n" before being fed to the quenching/recovery section 102.

When one or more additional reactors are utilized, the copolymerization mixture from Rx B is fed to RX "n" along with additional comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first, second and third reactors to the comonomer is from 60:1 to 1:1. The copolymerization mixture and additional comonomer is polymerized to add additional comonomer to the non-random isobutylene copolymer in the copolymerization mixture and further reduce randomness of the copolymer.

Whether using 1, 2 or more reactors, the product is recovered in quenching/recovery section 102. The recovered product has a molecular weight, Mn of from 200 to 20,000 Daltons. The reactors used in system 100 may be CSTRs, Loop Reactors or plug flow reactors (PFRs). The length/volume of each reactor section is dependent on the feed rate of each monomer, the residence time in each reactor section and the extent of the reaction as influenced by catalyst, modifier and monomer concentration and temperature of the reaction medium.

Thus system 100 may be operated in a multi-reactor configuration wherein:
Monomers
  Primary Monomer: Isobutylene, (I) is fed to Rx A (optionally comonomer can also be fed to the first reactor)
  Co-Monomer 1 (A) is fed to Rx B
  Co-Monomer 2 (B) is fed to RX "n"
  Co-monomers A,B are chosen from of monomers which
    Preferably contain a double bond allowing formation of a tertiary carbocation
    Preferably contain more than 1 double bonds to be used to incorporate such that pendant and terminal double bonds are rendered in the final molecule
Catalyst and Modifier
  Either or both or neither may be added in locations indicated on FIG. 1.

When using a two reactor system where isobutylene, (I) is fed to Rx A and co-monomer 1 (A) is fed to Rx B, a weighted non-random copolymer is produced in which the concentration of the first monomer may be depleted to less than 30% of the original concentration and a second monomer is added to the end of the growing chain leaving a high concentration of the second monomer at the end of the polymer. A weighted non-random copolymer of isobutylene and copolymer produced has a repeat structure which may be represented:

IIIIIIIIIIIIIIIIAIAAIIAAAIAIAAAAAIA

This mode of operation and the product is represented in the following Table 1:

TABLE 1

Reactor Configurations

| Config. | Monomers Used | Inj. Loc. (A/B) | Rxr_A | Rxr_B | Cat./Mod. at A | Cat./Mod. at B | Resultant Polymer |
|---|---|---|---|---|---|---|---|
| A + B | I, Co-1 (a secondary, different monomer & isobutylene) | Isobutylene at A & Co-1 at B | LOOP/ CSTR | PFR/ Loop | YES | YES | NON-RANDOM (WEIGHTED) I-I-I-I-I-I-I-I-A-A-I-I-A-I-A-A |

Non-random copolymers of the invention may be made using multiple or single reactors by polymerizing isobutylene with or without a comonomer followed by quenching or isolating an initial product, optionally purifying the intermediate product, followed by further reaction with a different monomer feed (with or without additional catalyst as necessary) to produce a non-random copolymer of the invention. In one preferred embodiment for making non-random copolymer, a single reactor may be fed with a pre-formed isobutylene homopolymer or oligomer with from 2 to 40 repeat units along with the comonomers noted herein and optionally additional Lewis Acid Catalyst and a diluent such as isobutane or hexane. Polymerization is carried out as noted above in the reactor to yield a copolymer with a number average molecular weight, Mn, of from 20 to 20,000 Daltons and a molar ratio of isobutylene repeat units to copolymer repeat units of from 60:1 to 1:1. This embodiment may employ recycle streams from an isobutylene reactor containing low molecular weight isobutylene homopolymer or oligomers, typically having a molecular weight of 800 Daltons or less, such as from 500-600 Daltons. Suitably, the feed contains triisobutylene and/or tetraisobutylene and/or butadiene. Butadiene may be present in the recycle stream in amounts of from a few ppm up to several weight percent of butadiene if so desired.

In some embodiments, the inventive process is operated in connection with a loop reactor wherein the recirculation rate is much higher than the feed rate; ratios of recirculation to feed ratios may be anywhere from 5:1 to 40:1.

Figure 2:
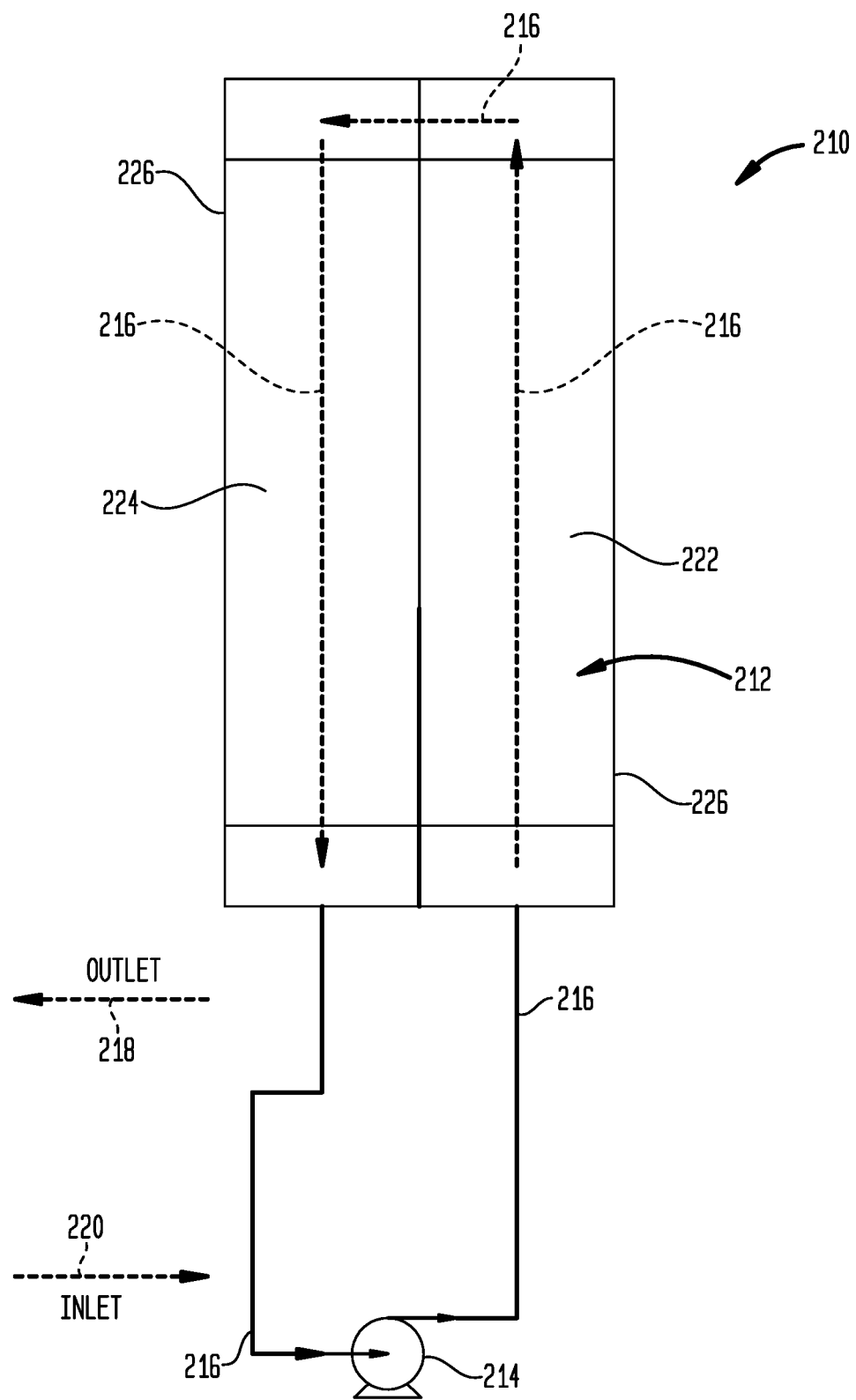
FIG. 2 is a schematic diagram illustrating a loop reactor suitable for use in connection with the present invention.

Referring to FIG. 2, there is shown schematically a reactor system 210 which includes a two-pass loop reactor 212, a recirculation pump 214, a feed and recirculation loop indicated at 216, a product outlet indicated at 218 and a feed inlet indicated at 220. Reactor 212 includes a plurality of reaction tubes indicated at 222, 224 in a two-pass configuration within a heat exchanger shell indicated at 226.

In operation, isobutylene and comonomer feedstock, catalyst and modifier is continuously fed at 220 to the system, while pump 214 operates at a pressure differential to recirculate the reaction mixture in reactor 212 via loop 216, while product is continuously withdrawn at 218. Details of operating reactor 212 are provided in EP 1,242,464.

Instead of a homogeneous catalyst feed, a fixed bed loop reactor having generally the construction of FIG. 2 with heterogeneous catalyst packed in the tubes of described heat exchanger. In such cases, a supported $BF_3$:alcohol catalyst is charged to the system as is seen in U.S. Pat. No. 8,791,216, entitled Activated Inorganic Metal Oxide and U.S. Pat. No. 8,816,028, entitled Polyisobutylene Composition Having Internal Vinylidene and Process for Preparing the Polyisobutylene Polymer Composition. Optionally, additional liquid catalyst complex is injected into the system to replenish the catalyst charge.

Figure 3:
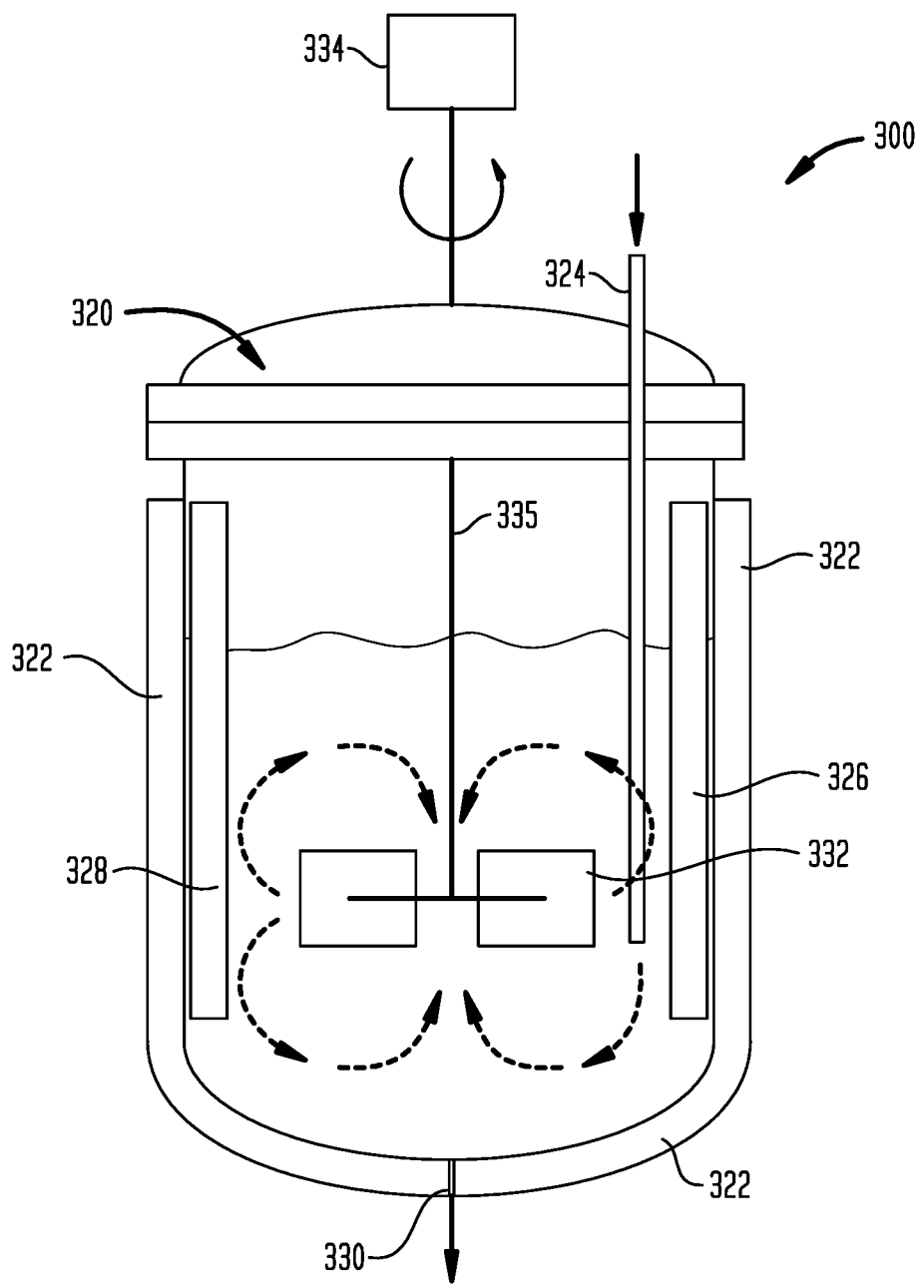
FIG. 3 is a schematic diagram illustrating a CSTR suitable for use in connection with the present invention.

In still another embodiment, the present invention is practiced using one or more CSTRs, as shown schematically in FIG. 3. CSTR apparatus 300 includes a pressurized reaction vessel 320 provided with a cooling jacket 322, a feed port 324, one or more baffles 326, 328, an outlet port 330, as well as an agitator 332, driven by a motor 334 via shaft 335.

In operation, the isobutylene and comonomer feedstock, together with catalyst and modifier, is fed continuously to vessel 320 in the liquid phase through feed port 324, while motor 334 drives agitator 332 via shaft 335 to keep the reaction mixture thoroughly mixed. The feed rate, cooling jacket temperature and catalyst concentration are manipulated to keep the reactor at the desired temperature and to achieve target conversion as product is continuously withdrawn from outlet port 330 after a characteristic steady state residence time in the reactor.

The residence time, feed composition and temperature in all cases are important features towards achieving the desired properties in the copolymer product. Preferably, at least a relatively high temperature and/or a short residence time is employed.

Following withdrawal from the reactor, the reaction mixture is quenched to deactivate the catalyst, preferably with an inorganic base such as sodium hydroxide or ammonium containing catalyst deactivator such as ammonium hydroxide. The effluent is then washed with water to remove salts as described in U.S. Pat. No. 6,858,188. Following washing, the processed effluent is flashed or distilled to remove oligomers in order to provide a purified product as is discussed herein.

Suitably, after washing the product is heated to a temperature of 150° C. or above as part of the purification processes to further remove fluorides. Suitable treating temperatures may be from 150° C. to 300° C. or so, optionally at lower than atmospheric pressure (taking care not to overheat the polymer), will further remove quench salts while removing oligomers. A particularly preferred range is from 200° C. to 250° C. A suitable post-polymerization purification methodology is illustrated in connection with FIG. 4.

Figure 4:
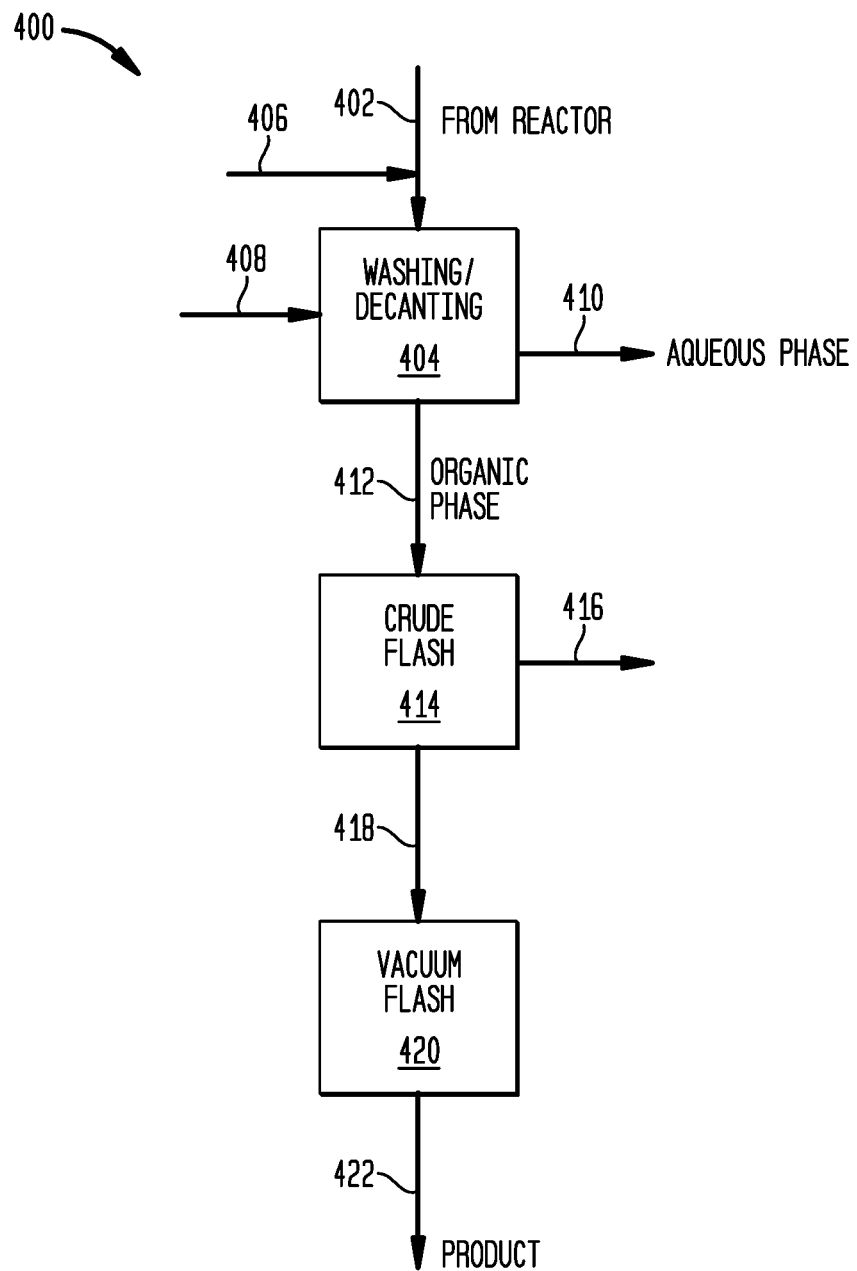
FIG. 4 is a block diagram illustrating a wash and distillation system for purifying isobutylene copolymer product.

In FIG. 4 there is illustrated schematically a process and apparatus 400 for purifying isobutylene copolymer produced in reactors such as reactors 212, 320 described above. The reactor outlet (for example, outlet 218 or outlet 330) feeds line 402 which is connected to a washing and decanting system 404. Line 406 provides a quenching agent such as aqueous ammonium hydroxide in excess of the amount needed to quench the catalyst. At 404, the quenched mixture is washed with water provided by way of line 408 and separated into two phases, an aqueous phase containing catalyst reside and ammonium hydroxide and a hydrocarbon phase containing polymer, unreacted monomer and solvents. The aqueous phase exits 404 via line 410 for further processing and recycle, while the organic phase exits 404 via line 412 and is heated and flashed at 414 under positive pressure at temperatures of 120-200° C. to remove monomer and light oligomers, usually up to C12 oligomers which exit via line 416 for further processing.

The partially purified isobutylene copolymer is forwarded via line 418 to a vacuum flash or distillation unit 420, where the product is further purified by distillation to remove oligomers, especially C8 to C24 oligomers at temperatures of from 150° C.-300° C. and pressures of from 0.25 psia to 10 psia or so. Alternatively, a wipe film evaporator or like apparatus can be employed to eliminate oligomers from the composition. The purified isobutylene copolymer product is removed at 422.

Examples 1-7—Non-random Copolymer

Non-random copolymers of isobutylene and para-methyl styrene or isobutylene and isoprene were made using the process described above as in apparatus 100, FIG. 1. In this system, Rx A was a loop reactor (FIG. 2) and Rx B was a straight plug flow reactor (PFR) operated at ¼ the residence time (RT) of the loop reactor. In Examples 1-7, the RT in the loop reactor was 2 minutes and 0.5 minutes in the PFR. Catalyst/modifier was injected at location "A" only along with isobutylene at 90 wt %, 10% solvent. The para-methyl styrene (pmStyrene) or isoprene comonomer was injected at co-monomer location as shown in connecting line 108. The product exiting the second reactor was purified as detailed in connection with FIG. 4. Batches of a random copolymer, were made by injecting isoprene or para-methyl styrene as indicated in the table below as co-monomer (wt % monomer in feed based on total monomer feed) in line 104, FIG. 1 to allow the same residence time for both the random and non-random copolymer. A control batch of a poly-isobutylene homopolymer was also made in the apparatus.

The samples produced were made by varying the concentration of the co-monomer between 5 wt % and 10 wt % (based on isobutylene feed) in each case. Conditions for the various batches are shown in the Table 2 below along with the product attributes for Examples 1-7.

TABLE 2

Non-random Copolymer Synthesis

| | T RxA (° F.) | T Rx B (° F.) | RT (minutes) | Mn | PDI | Tg | Slope at Transition Point |
|---|---|---|---|---|---|---|---|
| Example 1 Polyisobutylene-Control | 85 | 46-53 | 2.5 | 1165 | 2.04 | −78.4 | 0.0108 |
| Example 2 10% Isoprene-Random | 65 | 40-50 | 2.5 | 1088 | 1.54 | −73.6 | 0.0054 |
| Example 3 10% Isoprene-Non-random | 65 | 40-50 | 2.5 | 1052 | 1.61 | −79.3 | 0.0099 |
| Example 4 5% pmStyrene-Random | 84 | 40-50 | 2.5 | 1041 | 1.75 | −74.7 | 0.0060 |
| Example 5 5% pmStyrene-Non-random | 84 | 40-50 | 2.5 | 1061 | 1.65 | −80.1 | 0.0100 |
| Example 6 10% pmStyrene-Random | 84 | 40-50 | 2.5 | 797 | 2.62 | −73.5 | 0.0045 |
| Example 7 10% pmStyrene-Non-random | 84 | 40-50 | 2.5 | 1047 | 1.68 | −82.9 | 0.0111 |

Figure 5:
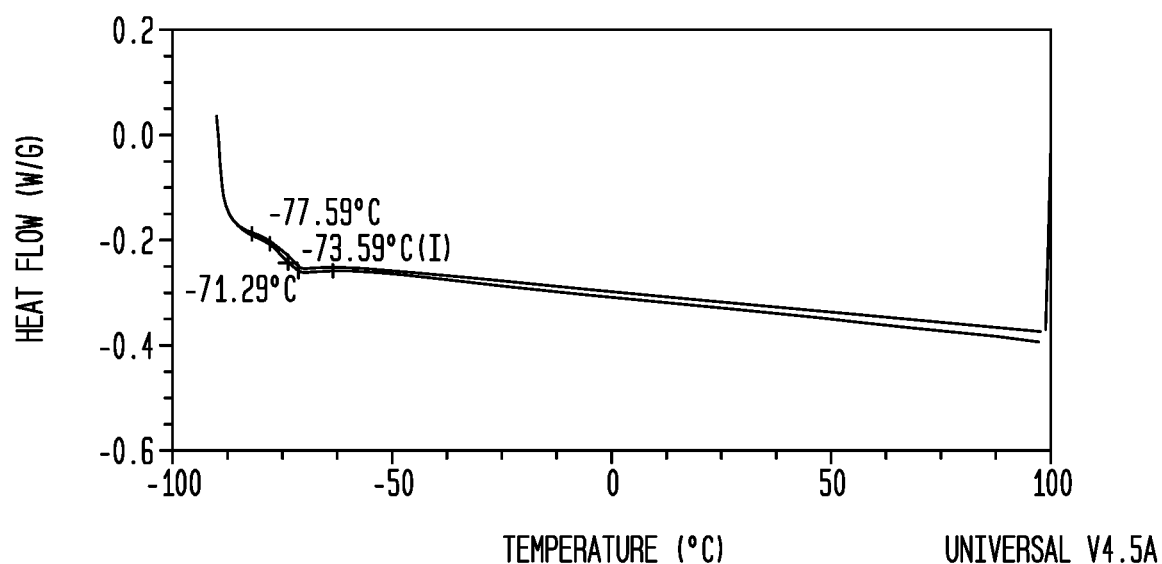
FIG. 5 is a plot of DSC data (heat flow vs. temperature) for random copolymer of isobutylene and 10 wt. % isoprene.
Figure 6:
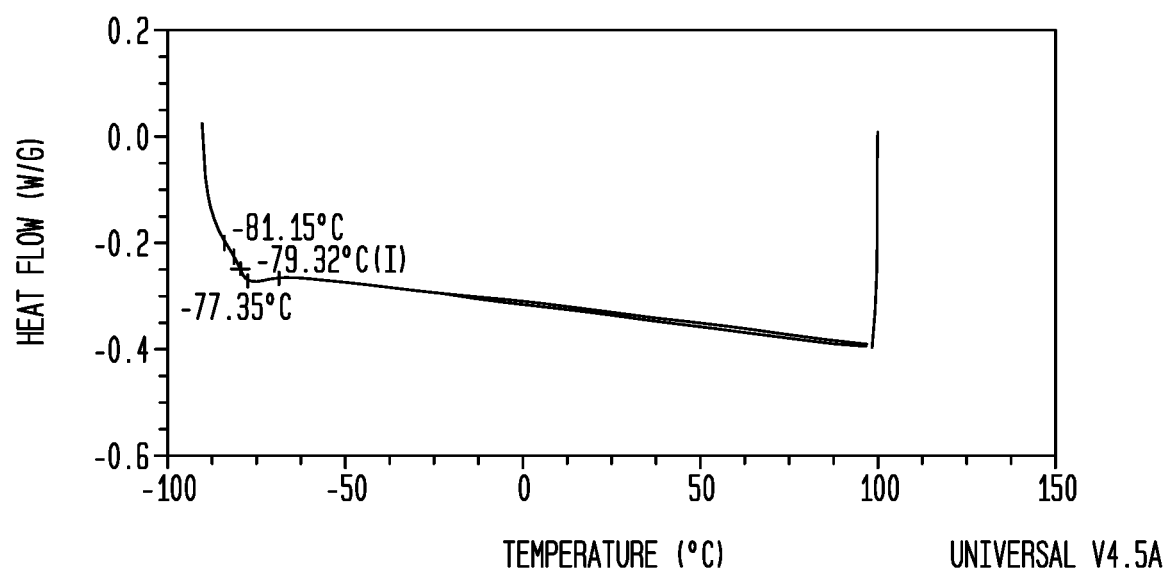
FIG. 6 is a plot of DSC data (heat flow vs. temperature) for a non-random copolymer of isobutylene and 10% wt. % isoprene.

Tg's of the products were by measured by Differential Scanning calorimetry (DSC) as follows: Approximately 10-20 mg of sample was weighed-out on an analytical balance in a tared aluminum hermetic sample pan with an aluminum hermetic lid. First, the sample is allowed to equilibrate at −90° C. A 10° C./min temperature ramp up to 100° C. follows to measure the thermal properties. A total of two cycles were run, where the first cycle is used to reset the thermal history of the sample followed by an additional cycle to determine the glass transition temperature. DSC results for Examples 2 and 3 are shown in FIGS. 5 and 6. All testing was performed on a DSC Q20 by TA Instruments. The DSC curves were analyzed for slope (Heat/Temperature) around the glass transition temperatures by using a linear least-squares fit (bivariate fit of heat In, W/g by temperature) around the Tg from temperatures slightly above and below, typically 5-15 points within 0-15° C. below Tg were used and 0-5 points above Tg were used. The points selected are chosen to encompass the Tg and include as linear a region as possible above and below the Tg.

The results show that polymer made by injecting the secondary co-monomer to line 108 produced a non-random copolymer. This was demonstrated by glass transition (Tg) temperature analysis of the seven polymers listed above. The Tg analysis shows that in the cases where non-random copolymers were made, there was a significantly lower Tg as shown in the above table. A lower Tg for polymers of the same chemical compositions indicate a polymer with blocks of co-monomers in the structure as may be seen in Allen Noshay & James McGrath, Block Copolymers Overview and critical Survey, N Y, 1977, Chapter 5 (Di-Block Copolymers), p. 92.

Figure 7:
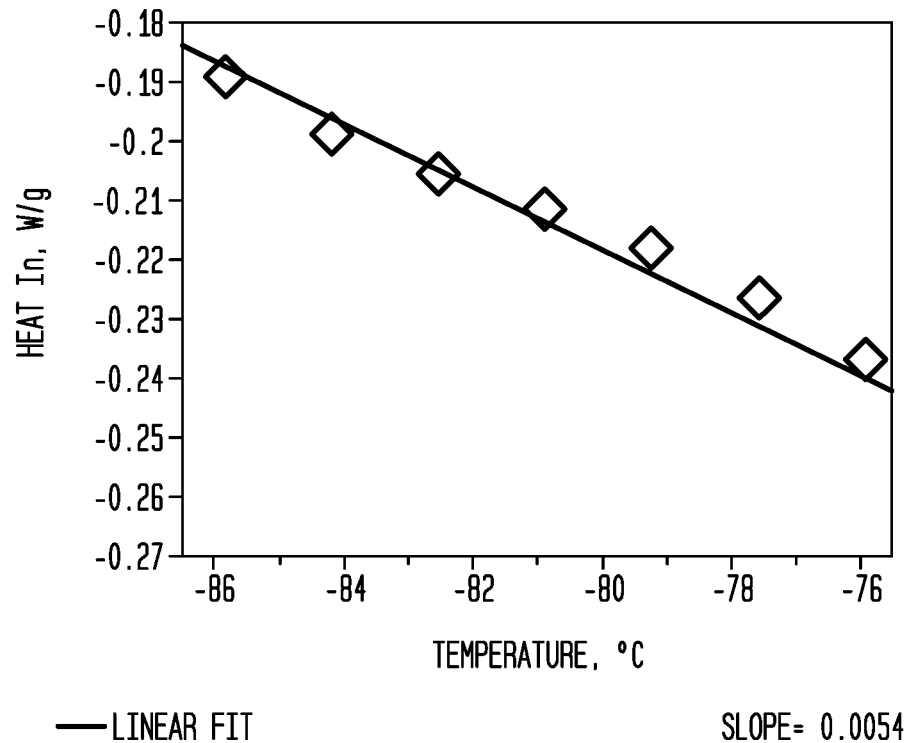
FIG. 7 is a graph showing the slope of the DSC curve of FIG. 5 about the glass transition temperature of the random copolymer.
Figure 8:
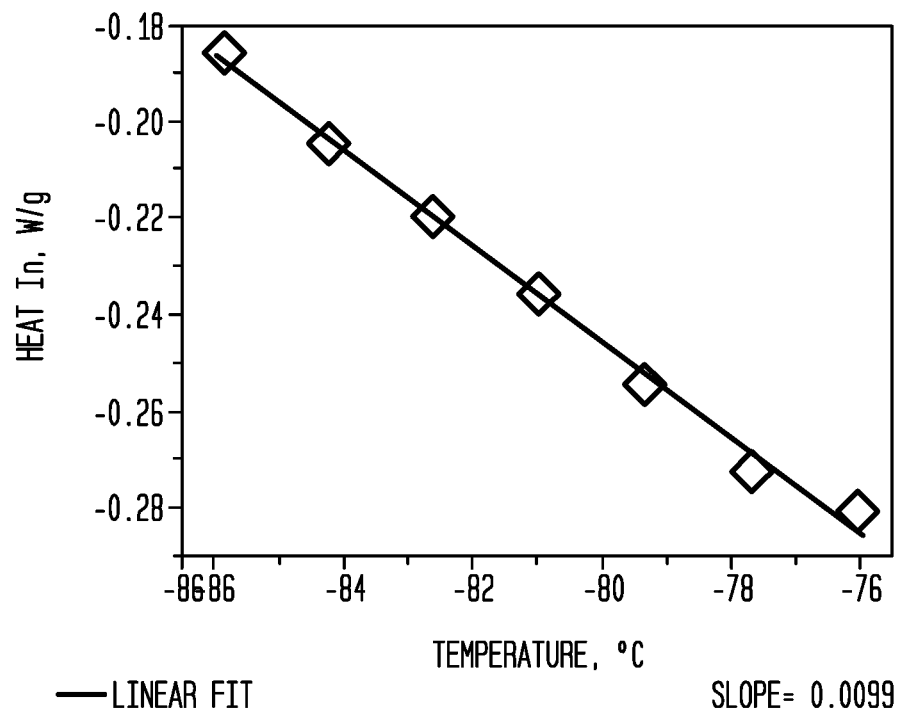
FIG. 8 is a graph showing the slope of the DSC curve of FIG. 6 about the glass transition temperature of the non-random copolymer.

Sample slope analysis of the curves produced by the Differential Scanning calorimeter (DSC) to produce the Tg data is presented in FIGS. 7 and 8 for Examples 2 and 3. The Table above provides results for Examples 1-7. The results show that the curve for the non-random copolymer has a more vertical nature about the glass transitional temperature points. Analysis of the slope shows that for the non-random copolymers with matching compositions, the slope is on average 2× greater than that of the random copolymer samples. This is another indication of non-random copolymer characteristics; as the non-random domains tend to crystallize in groups and thus behave less like an amorphous polymer. The more diagonal or "shallower" the curve between transition temperatures of the random copolymer is a characteristic of randomly distributed co-monomers which do not form larger domains of like crystallinity as do the block copolymers. See Kraus, Childers & Gruver, Journal of Applied Polymer Science, 11, 1581 (1967) and Angelo, Ikeda & Wallach, Polymer, 6,141 (1965).

The copolymers of the invention may be used to make a variety of derivatives for use in fuel or lubricant additives as well as rubber compositions, adhesives, sizings and resins such as unsaturated polyester resins or polyurethanes.

U.S. Pat. No. 5,663,457 to Kolp teaches to prepare alkylated hydroxyl aromatics by reacting polyisobutylene with hydroxyaromatics in the presence of an acidic ion exchange resin. This class of products is useful as lubricant and fuel additive compositions.

U.S. Pat. No. 5,725,612 to Malfer et al. discloses Mannich fuel additives prepared by reacting alkylated hydroxyaromatic compounds with an aliphatic polyamide and an aldehyde. Mannich reaction product fuel additives are also disclosed in United States Patent Application Publication No. US 2007/0068070 of Jackson et al. wherein the materials are prepared using a mixture of conventional and highly reactive polyisobutylene.

There is seen in United States Patent Application Publication No. US 2012/0000118 to Lange et al. low molecular weight polyisobutyl-substituted amines as dispersant boosters. Such compounds may be prepared by hydroformylating polyisobutylene followed by reductive amination as is well known in the art.

PIB-maleic anhydride reaction products such as Polyisobutylene Succinic Anhydrides (PIBSAs) and polyisobutenylsuccinimides (PIBSIs) are also prepared with the copolymers of the invention:

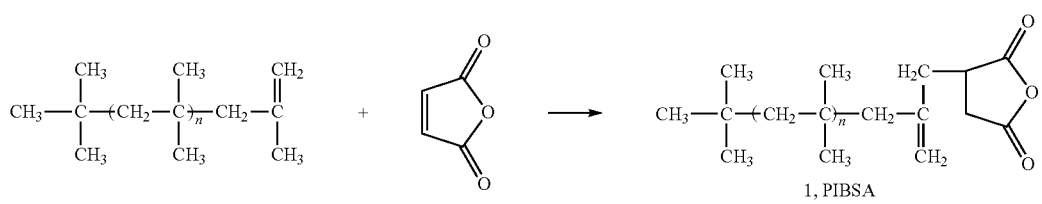

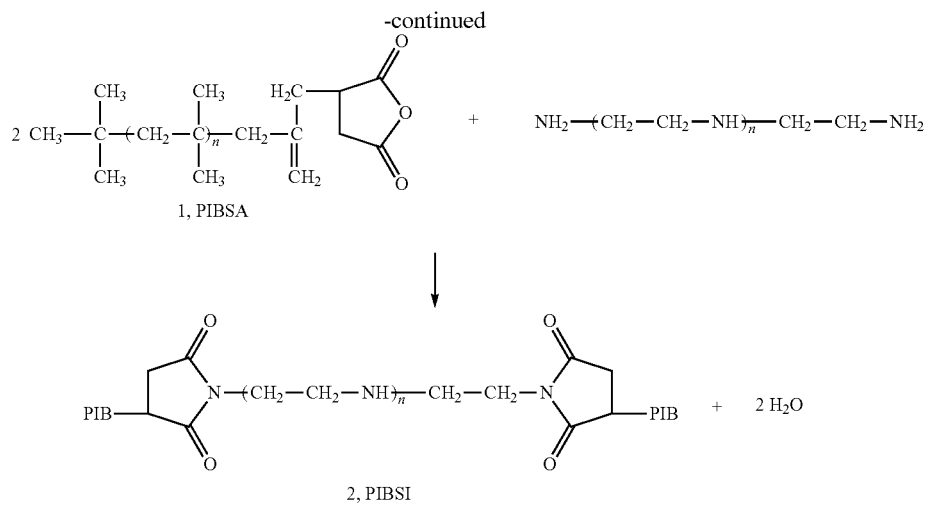

1, PIBSA

2, PIBSI

As is appreciated from the foregoing, Polyisobutylene Succinic Anhydride (PIBSA) is often used as an intermediate for the synthesis of polyisobutylene succinimide (PIBSI). PIBSA derivatives are prepared via thermal ene reaction with maleic anhydride. It has been found in accordance with the invention that the multiple reactive double bonds in the polyisobutylene isoprene copolymer used to make IP-PIBSA with more than one maleic anhydride attached to the polyisobutylene isoprene copolymer molecule increases the polar to non-polar molecule ratio in the dispersant which has unexpected and added advantage in dispersing property of the final molecule.

Exemplary PIBSA and PIBSI compounds are enumerated in *Polyfunctional PIB Succinimide Type Engine Oil Additives*, L. Bartha et al., *Lubrication Science*, August, 2001, pp. 313-328. Amines may also be prepared from a carbonyl functionalized PIB as described in U.S. Pat. No. 5,124,484, Col. 2, lines 38-60. The various derivatives may thus be represented:

Additional copolymers and derivatives within the purview of the present invention include the following:

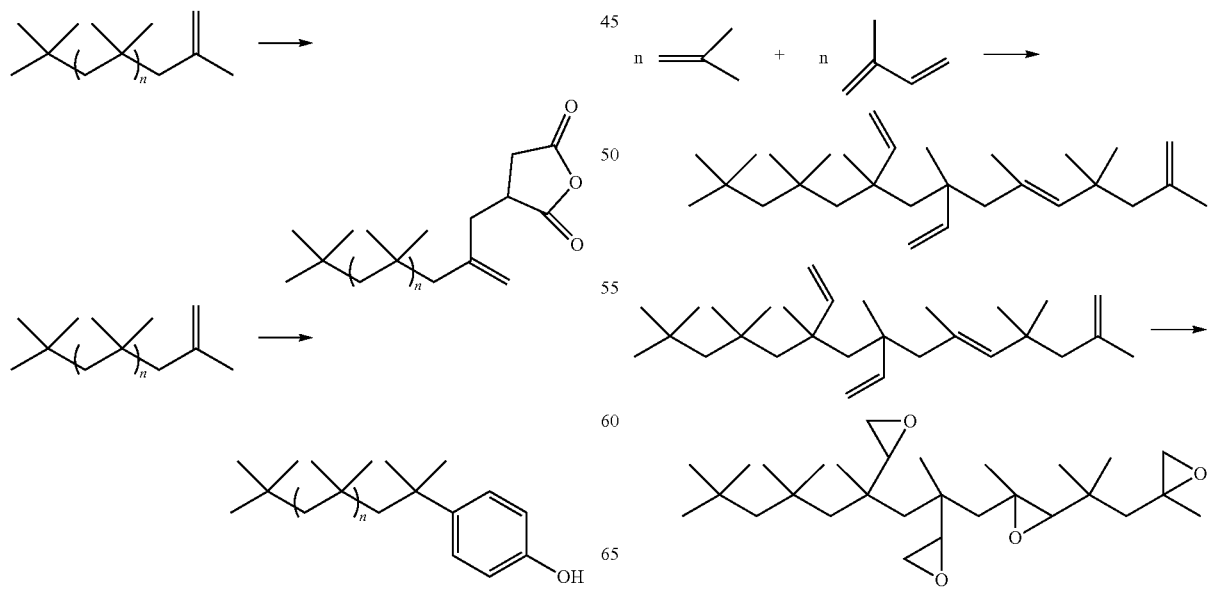

-continued

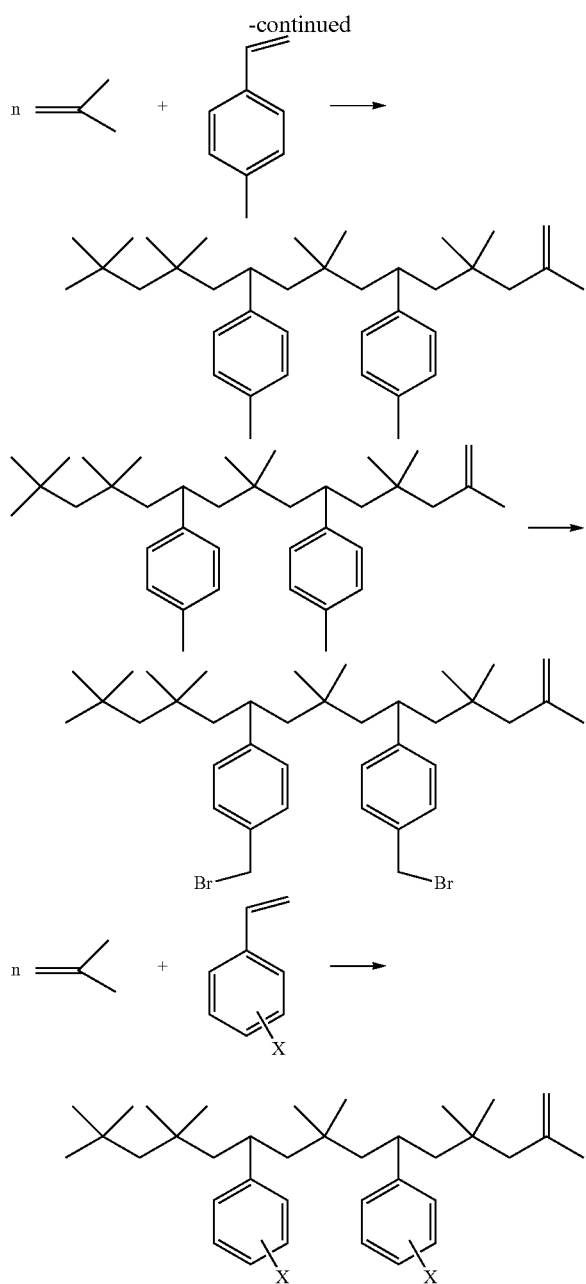

Adhesives are of numerous types, including chemically reactive, for example, epoxy type adhesives or thermoplastic adhesives such as hot melt adhesives or solvent based systems such as polyvinyl acetate emulsions. Pandit, R. et al., Epoxidation of Styrene/Butadiene Star Block Copolymer by Different Methods and Characterization of the Blends with Epoxy Resin, Macromol. Symp. 2014, 341, pp. 67-74 (Wiley, 2014) discloses various methods of epoxidating styrene/butadiene resins which are then blended with epoxy resins of the bisphenol-A type. The epoxidized resins are reported to make the blends more ductile. The reagents used to epoxidize the resins include m-chloroperoxy benzoic acid (MCPBA), peracetic aid (PAA), performic acid (PFA) and hexafluoro isopropanol (HFIP). Terpene resins have been disclosed for use in pressure-sensitive adhesives as tackifiers along with other resins and are reported to increase heat resistance of adhesives. Exemplary compositions might include 36% styrene-isoprene-styrene resin (SIS), 53% limonine resin, naphthenic oil and anti-oxidant.

The polyisobutylene/isoprene or other diene copolymers of the invention where many of the polymeric chains will have at least two double bonds is used as reactive plasticizer for adhesive formulations. Having multiple double bonds in the polymer chain facilitates crosslinking with pressure sensitive adhesives.

Paper sizing imparts hydrophobicity to paper which is generally very hydrophilic, thus allowing enhanced properties such as inking and water barrier properties. Paper sizing agents typically are of two classes, Alkyl Ketene Dimer (AKD) sizings or Alkyl Succinic Anhydride (ASA) sizings. ASA is typically an alpha olefin product in the range of 12-18 carbons prepared by reaction with maleic anhydride. ASA sizings are thus amphiphilic and reactive allowing integration into the paper via the succinic anhydride end and sizing properties are imparted by the hydrophobic hydrocarbon end. Thus, ASA is subsequently emulsified and added into the papermaking process either at the wet-end or sprayed on the paper web. The copolymers described herein are expected to offer enhanced sizing properties based on multiple succinic anhydride groups per molecule allowing better integration into the paper product and superior sizing properties. Further details are seen in: Hodgson, K.T. A review of paper sizing using alkyl ketene dimer versus alkenyl succinic anhydride, Appita J. 47(1994):5. pp. 402-406; Gess, J. M. Rosin. The Sizing of Paper 3rd edition. Eds. Gess, J. M. & Rodriquez, J. M. Publ. TAPPI Press. Atlanta. 2005. pp. 57-73. A detailed discussion of paper sizing compositions, their preparation and use is also found in ASA Optimisation-Control of Particle Size, Stability and Hydrolysis, Martorana et al, University of Applied Sciences—Munchen, Department of Paper Technology, Germany, Professional Papermaking 5 (2), pp. 34-42 (2008). U.S. Pat. Nos. 3,438,804 and 4,207,142 are of interest as well.

The copolymers of the invention may also be used in connection with preparing various resinous products, including unsaturated polyester resins (UPR). These resins are mostly used with reinforced and non-reinforced material for a wide variety of applications. Fiberglass and other inorganic filler reinforced polyester resins are used in cars, boats, construction, fire retardant resins and in electronic devices. However, non-reinforced polyester resins are used in coating applications. Reinforced polyester resin has increased mechanical properties as compared to the non-reinforced one.

Polyester resins are synthesized by condensation reaction of anhydride or acid and alcohol based functional group. In general, maleic anhydride, phthallic anhydride and 1,2 propane glycol is used for condensation reaction. For fire retardant material, brominated or phosphate derivatives of phthallic anhydride is used. Synthesis of polyester resins using these molecules are mostly brittle in character. To reduce the brittleness and increase the hydrolytic stability of resins, we use polyisobutylene succinic anhydride (PIBSA) or polyisobutylene based copolymer derivatives in place of maleic anhydride to make polyester resins.

Polyisobutylene copolymer based epoxy derivatives are also used for epoxy resins. These may be prepared by way of reacting the copolymers of the invention with a peroxidizing agent in order to provide epoxidized copolymers in accordance with the following:

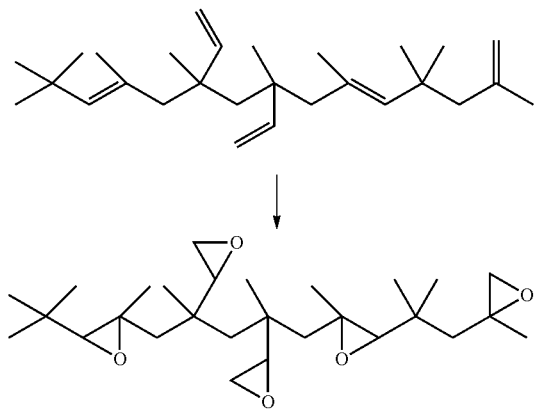

See U.S. Pat. No. 7,388,033 to Nagy et al. and the references noted above for details.

Polyisobutylene or PIB based copolymers may be functionalized with OH groups and reacted with di or polyisocyanates to make polyurethanes. See Magenau, Andrew Jackson David, "Polyisobutylene Chain End Transformations: Block Copolymer Synthesis and Click Chemistry Functionalizations" (2010). Dissertations. 872. http://aquila.usm.edu/dissertations/872. See also, U.S. Pat. No. 8,710,147 to Cherpeck et al.

The copolymers of the invention are likewise suitable to improve properties of rubber compositions, such as those comprising butyl rubber, styrene-butadiene rubber (SBR), natural rubber and the like. The copolymers may be used as such or more preferably derivatized to phenolic, succinimide or succinic anhydride form to provide further functionality and compatibility with the rubber composition. Typically, the copolymers of the invention are used in amounts of from about 2 to 25 percent by weight of copolymer or copolymer derivative based on the combined weight of the rubber and copolymer or copolymer derivative in the composition. The copolymers of the invention may be used as reactive intermediates that are part of the rubber matrix production process by grafting onto the rubber matrix resin or copolymerizing with the rubber monomers during production of the rubber resin, thereby modifying the mechanical or physical properties of the rubber itself. The copolymers of the invention may also be compounded into the rubber in connection with curing to improve the mechanical or physical properties, and may be used as a replacement or enhancement for the typically used process (asphalt) oils during cure. Similarly, the copolymers of the invention may be applied after curing a rubber product and reacted with the cured product to improve properties of the product, for example frictional properties.

Due to increased functionality, viscosity and so forth, the copolymers of the invention further improve the properties of a rubber product as compared to conventional rubber/polyisobutylene based compositions as are seen in U.S. Pat. No. 4,465,829 to Graves and U.S. Pat. No. 9,752,020 to Wang et al. The copolymers of the invention can be tailored to the application. For example, a random or non-random isobutylene/styrene copolymer optionally derivatized to phenolic, succinimide or succinic anhydride form provides a better anchor in the matrix of an SBR system than PIB or other PIB copolymer compositions. So also, the diene copolymers of the invention are especially useful when used in connection with curing of the rubber product; here again the diene copolymers may be derivatized to phenolic, succinimide or succinic anhydride form.

EMBODIMENTS OF THE INVENTION

A method for making a non-random isobutylene copolymers includes: (a) providing a reaction mixture to a first reactor comprising isobutylene monomer as well as a Lewis acid polymerization catalyst; (b) polymerizing the reaction mixture in the first reactor while maintaining the first reactor at a temperature above −30° C. and utilizing a first reactor residence time of less than 45 minutes to polymerize at least 30% of the isobutylene monomer fed to the first reactor to produce an isobutylene prepolymer in a polymerization mixture; (c) feeding the polymerization mixture to a second reactor along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first and second reactors to the comonomer is from 60:1 to 1:1; (d) polymerizing the polymerization mixture and comonomer in the second reactor while maintaining the reactor at a temperature above −30° C. and utilizing a reactor residence time of less than 45 minutes to produce a non-random crude isobutylene copolymer in a copolymerization mixture; and (e) recovering a purified non-random isobutylene copolymer from the copolymerization mixture having a molecular weight, Mn of from 200 to 20,000 Daltons. This process may further include: (i) feeding the copolymerization mixture from the second reactor to a third reactor along with additional comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first, second and third reactors to the comonomer is from 60:1 to 1:1; and (ii) polymerizing the copolymerization mixture and additional comonomer to add additional comonomer to the non-random isobuylene copolymer in the copolymerization mixture. The first second and third reactors are typically selected from loop reactors, CSTRs and plug flow reactors.

Another methodology for making non-random isobutylene copolymers includes: (a) feeding a pre-formed isobutylene homopolymer or oligomer having from 2 to 40 repeat units to a reactor along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst and a diluent; (b) polymerizing the polymer and comonomer mixture in the reactor while maintaining the reactor at a temperature above −30° C. and utilizing a reactor residence time of less than 45 minutes to produce a non-random crude isobutylene copolymer in a copolymerization mixture; and (c) recovering a purified non-random isobutylene copolymer from the copolymerization mixture having a molecular weight, Mn of from 200 to 20,000 Daltons; wherein the molar ratio of isobutylene repeat units to comonomer repeat units in the non-random copolymer is from 60:1 to 1:1. Here again, the reactor is typically selected from loop reactors, CSTRs and plug flow reactors.

Suitable temperatures and residence times which may be selected for any of the processes of the invention appear in the following Table 3:

TABLE 3

Reaction Conditions

|  | Reactor Temperature | Residence Time, Each reactor |
|---|---|---|
| General | −30° C. to 35° C. | 45 minutes or less |
| Preferred | −20° C. to 35° C. | 20 minutes or less |
|  | −10° C. to 35° C. | 15 minutes or less |
|  | −5° C. to 35° C. | 10 minutes or less |
|  | 0° C. to 35° C. | 2 to 8 minutes |
|  | 5° C. to 35° C. | 20 seconds to 4 minutes |
|  | 10° C. to 35° C. |  |
|  | 15° C. to 35° C. |  |
|  | 20° C. to 35° C. |  |
|  | 25° C. to 35° C. |  |

When 2 reactors are used, the ratio of residence times for the first to second reactor is suitably from 1:1 to 6:1 typically 2:1 to 5:1 and in some preferred embodiments from 2.5:1 to 4.5:1.

The conversion of isobutylene monomer in any of the foregoing processes is suitably from 40% to 98%, more preferably from 50% to 95% or 55% to 90%, while the conversion of comonomer is suitably from 30% to 90%, more preferably from 40% to 85% or from 45% to 80%.

Polymerization is typically carried out in a loop reactor or in a CSTR. The Lewis Acid polymerization catalyst typically comprises a catalyst including $BF_3$, $AlCl_3$ or $EtAlCl_2$ and a co-catalyst comprising an alcohol, ether or ester or mixture thereof, most preferably the catalyst comprises $BF_3$ and an alcohol co-catalyst.

Overall molar ratios of isobutylene to the one or more comonomers in any of the processes of the invention is generally from 30:1 to 1:1, more typically the molar ratio of isobutylene to the one or more comonomers is from 12:1 to 1:1 or from 6:1 to 1:1. In some preferred embodiments, the molar ratio of isobutylene to the one or more comonomers is from 3:5 to 1:1. The one or more comonomers may consist essentially of isoprene, or alpha methyl styrene or mixtures thereof, or may consist essentially of butadiene, cyclopentadiene, dicyclopentadiene, limonene, piperylene or mixtures thereof.

In still further aspects of the invention, there is provided non-random isobutylene copolymers. These products have the attributes enumerated below in terms of molecular weight, molar ratios of derived units in the polymer, PDI, and in the case of diene comonomers, double bonds per molecule and vinylidene bonds per molecule enumerated in Table 4 below.

The purified or unpurified copolymer products of the invention may have the features indicated in the Table 4 below.

TABLE 4

Product Attributes

|  | General | Preferred |
|---|---|---|
| Molecular Weight, Mn Daltons | 200-10,000 | 250-3,000 |
|  |  | 250-1,500 |
|  |  | 250-900 |
|  |  | 250-700 |
|  |  | 200-600 |

TABLE 4-continued

Product Attributes

|  | General | Preferred |
|---|---|---|
| Double Bonds/Molecule | 1.25-5 | 1.75-3.5 |
| (Diene comonomer) | 1.3-4 | 3-4.5 |
| Vinylidene Bonds/ | 0.8-3.5 | 0.85-2 |
| Molecule |  | 1.2-1.8 |
| (Diene comonomer) |  |  |
| PDI | 1.2-4 | 1.4-2.5 |

The non-random isobutylene copolymer comprising repeat units derived from isobutylene and repeat units derived from one or more comonomers selected from isoprene, butadiene, cyclopentadiene, dicyclopentadiene, limonene, substituted styrenes, piperylene and C4 to C10 dienes other than isoprene, butadiene, limonene, cyclopentadiene or dicyclopentadiene generally have molar ratios of isobutylene derived repeat units to the comonomer derived repeat units of from 75:1 to 1.5:1 and the isobutylene copolymer has a molecular weight, Mn, of from 200 to 20,000 Daltons. The product may have any of the features noted above and the additional features noted below.

The molar ratio of isobutylene derived repeat units to the comonomer derived repeat units in the non-random copolymers of the invention (purified or unprified) is generally from 70:1 to 2:1, more preferably from 30:1 to 3:1, from 12.5:1 to 3:1. In some embodiments, the molar ratio of isobutylene derived repeat units to the comonomer derived repeat units is from 5:1 to 3:1. Most preferably, the isobutylene copolymer is substantially chloride-free.

Any isobutylene non-random copolymer of the invention comprising repeat units derived from isobutylene and a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene may be characterized in that the non-random copolymer exhibits a Tg at least 3.5° C. lower than a like random copolymer polymerized from the same monomer composition. More typically, the non-random copolymer of the invention exhibits a Tg at least 4.5° C. lower than a like random copolymer polymerized from the same monomer composition or exhibits a Tg at least 5.5° C. lower than a like random copolymer polymerized from the same monomer composition. In many cases, a non-random copolymer of the invention exhibits a Tg at least 7.5° C. lower than a like random copolymer polymerized from the same monomer composition. In many of the preferred embodiments enumerated above, the non-random copolymer of the invention exhibits a Tg of from 3.5° C. to 20° C. lower than a like random copolymer polymerized from the same monomer composition.

The isobutylene non-random copolymers of the invention may be incorporated into an adhesive composition, a rubber composition, a sizing composition, an unsaturated polyester resin, a fuel or lube additive composition, an epoxy resin or a polyurethane resin.

The following Embodiments 1-51 are exemplary of the present invention.

There is thus provided in accordance with the present invention Embodiment No. 1 which is a method of making a non-random isobutylene copolymer comprising:
 (a) providing a reaction mixture to a first reactor comprising isobutylene monomer as well as a Lewis acid polymerization catalyst;

(b) polymerizing the reaction mixture in the first reactor while maintaining the first reactor at a temperature above −30° C. and utilizing a first reactor residence time of less than 45 minutes to polymerize at least 30% of the isobutylene monomer fed to the first reactor to produce an isobutylene prepolymer in a polymerization mixture;

(c) feeding the polymerization mixture to a second reactor along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first and second reactors to the comonomer is from 60:1 to 1:1;

(d) polymerizing the polymerization mixture and comonomer in the second reactor while maintaining the reactor at a temperature above −30° C. and utilizing a reactor residence time of less than 45 minutes to produce a non-random crude isobutylene copolymer in a copolymerization mixture; and (e) recovering a purified non-random isobutylene copolymer from the copolymerization mixture having a molecular weight, Mn, of from 200 to 20,000 Daltons.

Embodiment No. 2 is the method according to Embodiment No. 1, further comprising:

(i) feeding the copolymerization mixture from the second reactor to a third reactor along with additional comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first, second and third reactors to the comonomer is from 60:1 to 1:1; and (ii) polymerizing the copolymerization mixture and additional comonomer to add additional comonomer to the non-random isobuylene copolymer in the copolymerization mixture.

Embodiment No. 3 is the method according to Embodiment No. 1, wherein the first and second reactors are selected from loop reactors, CSTRs and plug flow reactors.

Embodiment No. 4 is the method according to Embodiment No. 2, wherein the first second and third reactors are selected from loop reactors, CSTRs and plug flow reactors.

Embodiment No. 5 is a method of making a non-random isobutylene copolymer comprising:

(a) feeding a pre-formed isobutylene homopolymer or oligomer having from 2 to 40 repeat units to a reactor along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst and a diluent;

(b) polymerizing the polymer and comonomer mixture in the reactor while maintaining the reactor at a temperature above −30° C. and utilizing a reactor residence time of less than 45 minutes to produce a non-random crude isobutylene copolymer in a copolymerization mixture; and (c) recovering a purified non-random isobutylene copolymer from the copolymerization mixture having a molecular weight, Mn, of from 200 to 20,000 Daltons; wherein the molar ratio of isobutylene repeat units to comonomer repeat units in the non-random copolymer is from 60:1 to 1:1.

Embodiment No. 6 is the method according to Embodiment No. 5, wherein the reactor is selected from loop reactors, CSTRs and plug flow reactors.

Embodiment No. 7 is the method according to Embodiment No. 5, wherein the pre-formed isobutylene homopolymer or oligomer has a molecular weight of less than 800 Daltons.

Embodiment No. 8 is the method according to Embodiment No. 1, wherein the reactor(s) are maintained at a temperature of up to 35° C.

Embodiment No. 9 is the method according to Embodiment No. 1, wherein the reactor(s) are maintained at a temperature of above −20° C.

Embodiment No. 10 is the method according to Embodiment No. 9, wherein the reactor(s) are maintained at a temperature of above −10° C.

Embodiment No. 11 is the method according to Embodiment No. 10, wherein the reactor(s) are maintained at a temperature of −5° C. or above.

Embodiment No. 12 is the method according to Embodiment No. 11, wherein the reactor(s) are maintained at a temperature of 0° C. or above.

Embodiment No. 13 is the method according to Embodiment No. 12, wherein the reactor(s) are maintained at a temperature of 5° C. or above.

Embodiment No. 14 is the method according to Embodiment No. 13, wherein the reactor(s) are maintained at a temperature of 10° C. or above.

Embodiment No. 15 is the method according to Embodiment No. 14, wherein the reactor(s) are maintained at a temperature of 15° C. or above.

Embodiment No. 16 is the method according to Embodiment No. 15, wherein the reactor(s) are maintained at a temperature of 20° C. or above.

Embodiment No. 17 is the method according to Embodiment No. 1, utilizing reactor residence times of 20 minutes or less.

Embodiment No. 18 is the method according to Embodiment No. 17, utilizing reactor residence times of 10 minutes or less.

Embodiment No. 19 is the method according to Embodiment No. 1, wherein the conversion of isobutylene monomer is from 55% to 90%.

Embodiment No. 20 is the method according to Embodiment No. 1, wherein the conversion of comonomer is from 45% to 80%.

Embodiment No. 21 is the method according to Embodiment No. 1, wherein the Lewis Acid polymerization catalyst comprises $BF_3$ and an alcohol co-catalyst.

Embodiment No. 22 is the method according to Embodiment No. 1, wherein the molar ratio of isobutylene to the one or more comonomers added to the system is from 12:1 to 1:1.

Embodiment No. 23 is the method according to Embodiment 1, wherein the molar ratio of isobutylene to the one or more comonomers added to the system is from 6:1 to 1:1.

Embodiment No. 24 is the method according to Embodiment No. 1, wherein the one or more comonomers comprise isoprene.

Embodiment No. 25 is the method according to Embodiment No. 1, wherein the one or more comonomers comprise alpha methyl styrene or para methyl styrene.

Embodiment No. 26 is the method according to Embodiment No. 1, wherein the purified non-random isobutylene copolymer has a molecular weight, Mn, of from 200 to 3000 Daltons.

Embodiment No. 27 is the method according to Embodiment No. 26, wherein the purified non-random isobutylene copolymer has a molecular weight, Mn, of from 250 to 700 Daltons.

Embodiment No. 28 is the method according to Embodiment No. 1, wherein the comonomer is a diene monomer and the purified non-random isobutylene copolymer has, on average, from 1.25 to 5 double bonds per molecule.

Embodiment No. 29 is the method according to Embodiment No. 1, wherein the comonomer is a diene monomer and the purified non-random isobutylene copolymer has, on average, from 0.85 to 2 vinylidene double bonds per molecule.

Embodiment No. 30 is the method according to Embodiment No. 1, wherein the comonomer is a diene monomer and the purified non-random isobutylene copolymer has, on average, from 1.2 to 1.8 vinylidene double bonds per molecule.

Embodiment No. 31 is the method according to claim 1, wherein the purified non-random isobutylene copolymer has a PDI of from 1.2 to 4.

Embodiment No. 32 is a non-random isobutylene copolymer produced according to any one of Embodiment Nos. 1-31.

Embodiment No. 33 is the non-random isobutylene copolymer according to Embodiment No. 32, wherein the copolymer is incorporated into an adhesive composition.

Embodiment No. 34 is the non-random isobutylene copolymer according to Embodiment No. 32, wherein the copolymer is incorporated into a sizing composition.

Embodiment No. 35 is the non-random isobutylene copolymer according to Embodiment No. 32, wherein the copolymer is incorporated into an unsaturated polyester resin.

Embodiment No. 36 is the non-random isobutylene copolymer according to Embodiment No. 32, wherein the copolymer is incorporated into a fuel or lube additive composition.

Embodiment No. 37 is the non-random isobutylene copolymer according to Embodiment No. 32, wherein the copolymer is incorporated into an epoxy resin.

Embodiment No. 38 is the non-random isobutylene copolymer according to Embodiment No. 32, wherein the copolymer is incorporated into a polyurethane resin.

Embodiment No. 39 non-random isobutylene copolymer according to Embodiment No. 32, wherein the copolymer is incorporated into a rubber composition.

Embodiment No. 40 is a isobutylene non-random copolymer comprising repeat units derived from isobutylene and a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene, characterized in that the non-random copolymer exhibits a Tg at least 3.5° C. lower than a like random copolymer polymerized from the same monomer composition.

Embodiment No. 41 is the isobutylene non-random copolymer according to Embodiment No. 40, wherein the non-random copolymer exhibits a Tg at least 4.5° C. lower than a like random copolymer polymerized from the same monomer composition.

Embodiment No. 42 is the isobutylene non-random copolymer according to Embodiment No. 41, wherein the non-random copolymer exhibits a Tg at least 5.5° C. lower than a like random copolymer polymerized from the same monomer composition.

Embodiment No. 43 is the isobutylene non-random copolymer according to Embodiment No. 42, wherein the non-random copolymer exhibits a Tg at least 7.5° C. lower than a like random copolymer polymerized from the same monomer composition.

Embodiment No. 44 is the isobutylene non-random copolymer according to Embodiment No. 40, wherein the non-random copolymer exhibits a Tg of from 3.5° C. to 20° C. lower than a like random copolymer polymerized from the same monomer composition.

Embodiment No. 45 is the isobutylene non-random copolymer according to Embodiment No. 40, wherein the comonomer comprises isoprene.

Embodiment No. 46 is the isobutylene non-random copolymer according to Embodiment No. 40, wherein the comonomer comprises para methyl styrene or alpha methyl styrene.

Embodiment No. 47 is the isobutylene non-random copolymer according to Embodiment No. 40, wherein the comonomer comprises butadiene, cyclopentadiene, dicyclopentadiene, limonene, substituted styrenes other than alpha or para methyl styrenes, piperylene and C4 to C10 dienes other than isoprene, butadiene, cyclopentadiene, dicyclopentadiene, limonene or piperylene.

Embodiment No. 48 is the isobutylene non-random copolymer according to any one of Embodiment Nos. 40-47, wherein the molar ratio of isobutylene-derived repeat units to the comonomer-derived repeat units is from 70:1 to 2:1.

Embodiment No. 49 is the isobutylene non-random copolymer according to any one of Embodiment Nos. 40-47, wherein the molar ratio of isobutylene-derived repeat units to the comonomer-derived repeat units is from 30:1 to 3:1.

Embodiment No. 50 is the isobutylene non-random copolymer according to any one of Embodiment Nos. 40-47, wherein the molar ratio of isobutylene-derived repeat units to the comonomer-derived repeat units is from 12.5:1 to 3:1.

Embodiment No. 51 is the isobutylene non-random copolymer according to any one of Embodiment Nos. 40-47, wherein the molar ratio of isobutylene-derived repeat units to the comonomer-derived repeat units is from 5:1 to 3:1.

Additional Examples

Additional Examples 8-38 below demonstrate that isobutylene copolymers are readily prepared at relatively elevated temperatures to yield copolymers with low molecular weights and, in the case of diene comonomers, increased double bond functionality which is particularly useful for preparing derivatives and their use as crosslinking agents as shown herein. The non-random copolymers of the invention are used in like amounts in the various products demonstrated in Examples 8-38 and are prepared under substantially the same reaction conditions, and overall molar ratios of reactants and catalysts, complexing agents and modifiers.

Examples 8-14-Synthesis of PIB/Isoprene Copolymer

Using a loop reactor as in FIG. 2, polymerization was carried out by providing isobutylene, isoprene, along with BF$_3$ catalyst and a methanol co-catalyst to the circulation loop. Isobutylene and isoprene are dried on molecular sieves before use. The blended feedstock was fed to the reactor and polymerized in the liquid phase at the temperatures indicated in the table below and an average residence time of less than 10 minutes; typically 4 minutes. Methanol/BF$_3$ molar ratio was provided in the range of 0.5-2.0. After the completion of reaction, polymer was quenched with NH$_4$OH and washed with water. Wash water was separated off and product was further purified by vacuum distillation. The purified product (IP-PIB) had isobutylene conversions by weight %, isoprene conversion by weight %, average number of double bond per polymer molecule between 1-5, molecular weight, Mn, in Daltons and a vinylidine double bond content per molecule as indicated in Table 5 below.

TABLE 5

PIB/Isoprene Copolymers

| Feature: | Product 8 | Product 9 | Product 10 | Product 11 | Product 12 | Product 13 | Product 14 |
|---|---|---|---|---|---|---|---|
| Isobutylene Content of feed (V %) | 88 | 88 | 85 | 85 | 80 | 80 | 65 |
| Isoprene (V %) | 2 | 2 | 5 | 5 | 10 | 10 | 25 |
| Isobutane (V %) | 10 | 10 | 10 | 10 | 10 | 10 | 10 |
| Reaction temp (° F.) | 75 | 58 | 62 | 72 | 75 | 65 | 75 |
| Residence Time (Min) | <10 | <10 | <10 | <10 | <10 | <10 | <10 |
| alcohols:BF$_3$ molar ratio | 1.0 | 1.7 | 1.0 | 1.7 | 1.0 | 1.7 | 1.0 |
| Conversion (iC4=) wt % | | 71.3 | 61.6 | 80.8 | 87.6 | 85.0 | 72.2 |
| Conversion (iC5=) wt % | | 56.8 | 52.5 | 68.7 | 75.6 | 75.1 | 61.2 |
| Mn (GPC) | 1050 | 1060 | 1050 | 583 | 600 | 600 | 600 |
| PDI | 1.93 | 1.9 | 2.2 | 1.54 | 1.52 | 1.41 | 1.48 |
| Average # of double bond/molecule* | | 1.3 | 1.8 | 1.5 | 2.0 | 2.0 | 3.4 |
| Vinylidene double bond/molecule** | | 0.83 | 0.83 | 0.81 | 0.98 | 1.25 | 1.7 |

*Based on conversion; average number of double bond per molecule is measured based on the conversion of isobutylene and isoprene; sample calculation below
**Determined by NMR Sample Calculation of Number of Double Bonds/Molecule from Conversion and Molecular Weight Data The number of double bonds per molecule in the foregoing Table is calculated from the conversion and molecular weight data as the average number of diene-derived units per molecule plus one. The average number of diene units is calculated by dividing the number average molecular weight, Mn, of the polymers by the molar average molecular weight of the repeat units incorporated into the copolymer and multiplying by the mole fraction isoprene units in the copolymer. Molar contents are calculated from the conversion data. Thus, for Product 14, the average number of double bonds per molecule is calculated as 2.4+1 or 3.4 using the foregoing data and densities of 0.681 and 0.588 for isoprene and isobutylene, respectively. For purposes of the calculation, molecular weights of 68 and 56 are used for isoprene and isobutylene. The average number of double bonds for Product 14 is thus calculated:

$$((600/((0.237*68)+(0.763*56)))*0.237)+1=3.4 \text{ double bonds/molecule}$$

Comparative Example 1A

Utilizing a 40 mL reaction vial, 10% of isoprene was mixed with isobutylene and equilibrated a reaction mixture to −15° C. Subsequently, methanol/BF3 catalyst in a 1:1 molar ratio was added and the mixture reacted for 10 minutes, and then the polymer was quenched with NH$_4$OH and washed with water. The product was further purified by vacuum distillation to remove unreacted product volatiles. Purified product had isobutylene conversion of less than 55% with a number average molecular weight of Mn 1100. Despite a residence time of 10 minutes (more than twice the residence time of the loop reactor examples noted above) isobutylene conversions were less than about 55%.

Examples 15-17—Synthesis of Isobutylene-Styrene Copolymer

Using a loop reactor of the class described in connection with FIG. 2, polymerization was carried out by providing isobutylene, para-methyl styrene (pmStyrene), along with BF$_3$ catalyst and a methanol co-catalyst to the circulation loop. Isobutylene and isobutane are dried on molecular sieves before use. The blended feedstock was fed to the reactor and polymerized in the liquid phase at the temperatures indicated in the table below and an average residence time of less than 10 minutes; typically 4 minutes. Methanol/BF$_3$ molar ratio was provided in the range of 0.5-2.0. After the completion of reaction, polymer was quenched with NH$_4$OH and washed with water. Wash water was separated off and product was further purified by a 2 stage flash separation. The purified product had isobutylene conversions by weight % and percentage incorporation of para methyl styrene in the polymer chain as indicated in Table 6 below.

TABLE 6

PIB/Styrene Copolymers

| Feature: | Product 15 | Product 16 | Product 17 |
|---|---|---|---|
| Isobutylene Content of feed (V %) | 85 | 80 | 50 |
| pmStyrene (V %) | 5 | 10 | 50 |
| Isobutane (V %) | 10 | 10 | 10 |
| Reaction temp (F.) | 77 | 77 | 62 |
| Residence Time (Min) | <10 | <10 | <10 |
| alcohols:BF$_3$ molar ratio | 1.0 | 1.0 | 1.0 |

TABLE 6-continued

PIB/Styrene Copolymers

| Feature: | Product 15 | Product 16 | Product 17 |
|---|---|---|---|
| Conversion (iC4 =) wt % | 61 | 40 | 5 |
| Mn (GPC) | 850 | 700 | 900 |
| PDI | 1.93 | 1.9 | 2.2 |
| Molar % of styrene/molecule | 11 | 22 | 90 |

In Examples 15-17 the percentage of para-methyl styrene incorporation in the polymeric chain was calculated based on proton NMR spectroscopy. For products 8-10, aromatic region peaks between 6.5-7.5 ppm are due to aromatic protons, whereas peaks between 0.1-5.7 are due to aliphatic protons. Based on the peak intensity of aromatic and aliphatic regions, % incorporation of styrene content in the polymeric chain is calculated. A detailed description of the analysis and calculation of the molar composition of the copolymers is reported in the literature, Journal of Macromolecular Science, Part A: Pure and Applied Chemistry, 32:11, 1809-1830 (1995).

It is seen in the data that the more reactive styrene is incorporated into the copolymer at much higher levels relative to isobutylene and pmStyrene in the feed at elevated temperatures.

Examples 18-21—Succinic Anhydride Synthesis

In a parr reactor, using Product 14 as shown in Table 5, 1:3 molar ratio of product 14 and maleic anhydride was added at room temperature. The reaction mixture was stirred for 5 minutes and then heated to 210 degree Celsius for 12 hours to reaction completion. After, excess maleic anhydride was removed using vacuum and reaction product was collected. Product yield was more than 90%. Product made using polyisobutylene isoprene copolymer is higher in viscosity than the one prepared from polyisobutylene succinic anhydride. This is likely due to crosslinking of double bonds at higher temperature. Additional ratios of feed and suitable reaction conditions are noted in the following Table 7.

TABLE 7

Succinic Anhydride Synthesis

| Example | PIB:MA ratio Molar | Hold Temperature | Comments |
|---|---|---|---|
| 18 | 1:1 based on vinylidene in polymer | For 4 hrs @197 C. | 1:1 ratio of PIB:MA was added to pre heated PIB. Reaction mixture was heated to 197 C. for 4 hrs and then temperature was increased to 210 C. for another 7 hrs. |
| 19 | 1:1 on based on vinylidene in polymer | For 4 hrs @197 C. | 1:1 ratio of PIB:MA was added to pre heated PIB. Reaction mixture was heated to 197 C. and held for 4 hrs and then temperature was increased to 225 C. for another 7 hrs. Reactor pressure at 225 C. was 36.6 Psig |
| 20 | 1:1.4 based on vinylidene in polymer | Hold for 4hrs @ 200 C. | 1:1.4 ratio of PIB:MA was added to pre heated PIB. PIBSA sample was collected for analysis after 4 hrs at 200 C. Then reaction mixture was heated to 225 C. for 12 hrs. PIBSA sample was collected after 12 hrs. |

TABLE 7-continued

Succinic Anhydride Synthesis

| Example | PIB:MA ratio Molar | Hold Temperature | Comments |
|---|---|---|---|
| 21 | 1:1.4 based on based on vinylidene in polymer | No hold | 1:1.4 ratio of PM:MA was added to pre heated PIB. PIBSA sample was collected for analysis after 4 hrs at 200 C. Then reaction mixture was heated to 225 C. for 12 hrs. PIBSA sample was collected after 16 hrs. |

Examples 22-27—Paper Sizing

Samples of PIB or copolymer of isobutylene and 5 wt % isoprene (based on monomer feed) were maleated using the thermal reaction of addition of maleic anhydride to the reactant at 210° C. for 18 hours. The standard sizing agent, dodecanyl succinic anhydride, a 12 carbon alkenyl succinic anhydride (ASA), was used as a control in all tests. To make the sizing emulsion using the anhydride sizing agents, 15 g of the alkylated succinic anhydride was combined with 185 g 4% starch solution and 1 or 0 ml emulsion stabilizing agent, Genapol 100, and the mixture was emulsified (blended) for 90 seconds.

No. 42 Whatman filter paper (unsized 6 samples per treatment group) was tared for untreated weight and then immersed into an emulsion prepared as noted above. Within 5 seconds the samples were removed, air dried overnight, and then oven dried (80° C.) for 4 hours. The samples were then weighed for uptake of solids from the emulsion. Details for Examples 22 to 27, referred to as Examples A-E and X, appear in Table 8 below.

TABLE 8

Sizing Compositions

| Sample | Description of components blended with starch | Abbrev. Name | Sizing Emulsion Uptake (g) | Water Uptake (g) |
|---|---|---|---|---|
| PIBSA-450+ | PIB of Mn 450 maleated, + Genapol | A | 0.201 | 0.98 |
| 5% IP-PIBSA+ | 5% isoprene random copolymer maleated, + Genapol | B | 0.196 | 0.36 |
| PIBSA-450− | PIB of Mn 450 maleated, − Genapol | C | 0.118 | 0.57 |
| PIB-450+ | PIB of Mn 450 non maleated, + Genapol | D | 0.322 | 1.90 |
| ASA+ | Alkenyl Succinic Anhydride, + Genapol | E | 0.281 | 1.84 |
| Control | Untreated paper | X | 0.00 | 2.01 |

Figure 9:
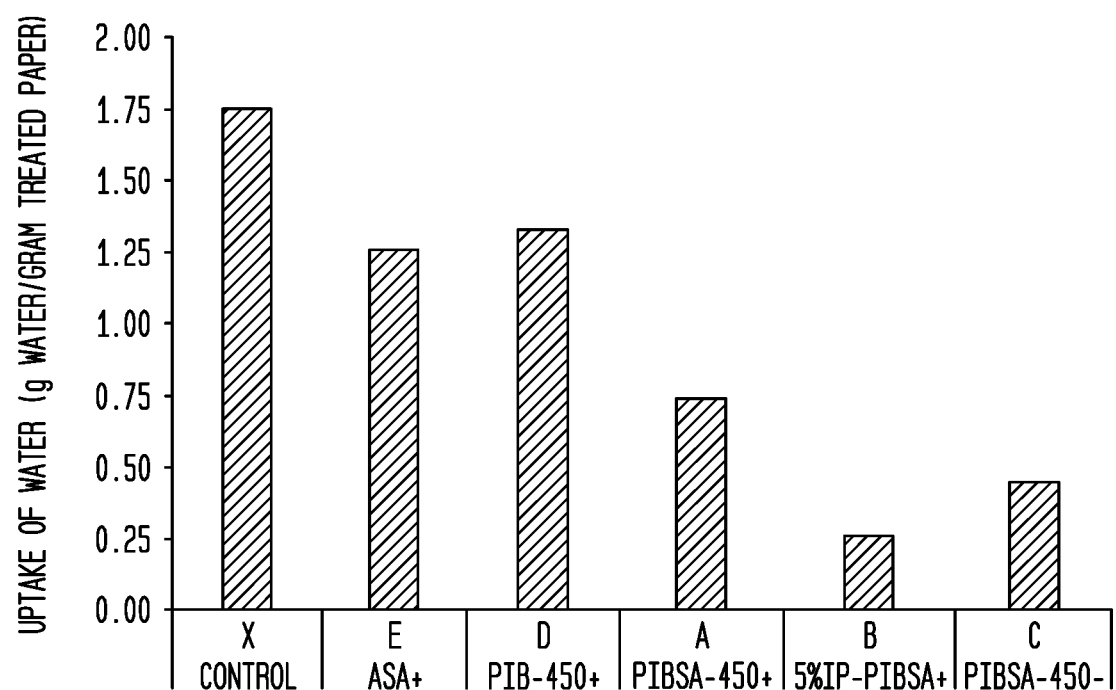
FIG. 9 is a histogram of water uptake of various untreated paper samples treated with sizing emulsions.

The degree of sizing Hydrophobicity Index, (HI) was determined using a modified Cobb Test as follows: the paper samples were immersed fully in water for 30 seconds, then blotted with a blotting towel (new each time), followed by rolling with a 1 Kg weight 5×, then weighed immediately to establish the amount of water uptake (n=5). Note that an untreated control was also used. Water uptake for the samples appears above in Table 8 and in FIG. 9 where water uptake is normalized to grams of treated paper.

A calculated Hydrophobicity Index takes into account the weight of sizing agent per gram of paper used in the test, which is then compared to ASA (ratio of the two) after first normalizing to untreated control. HI>1 means the sample is more hydrophobic than ASA treated. A sample calculation is set forth below:

All paper samples used were substantially the same size, thus equivalent in paper content and weight of paper need not be normalized in the calculation.

Terms:
A=(Grams of water uptake)$_{avg}$ [g]=grams of water taken up by the treated sheets
A*=(Grams of water uptake)$_{ASA}$ [g]=average grams of water taken up by the paper samples
B=(Sizing Emulsion Uptake)$_{avg}$ [g]=average grams of a sizing agent taken up by the paper samples
B*=(Sizing Emulsion Uptake)$_{ASA}$ [g]=grams of a sizing emulsion taken up by the ASA treated sheets
A dimensionless hydrophobicity index (HI) is thus calculated as:

$$HI = 1 + [(A*/B*) - (A/B)]/(A/B) \text{ or:}$$

$$HI = 1 + \frac{\frac{A*}{B*} - \frac{A}{B}}{\frac{A}{B}}$$

Figure 10:
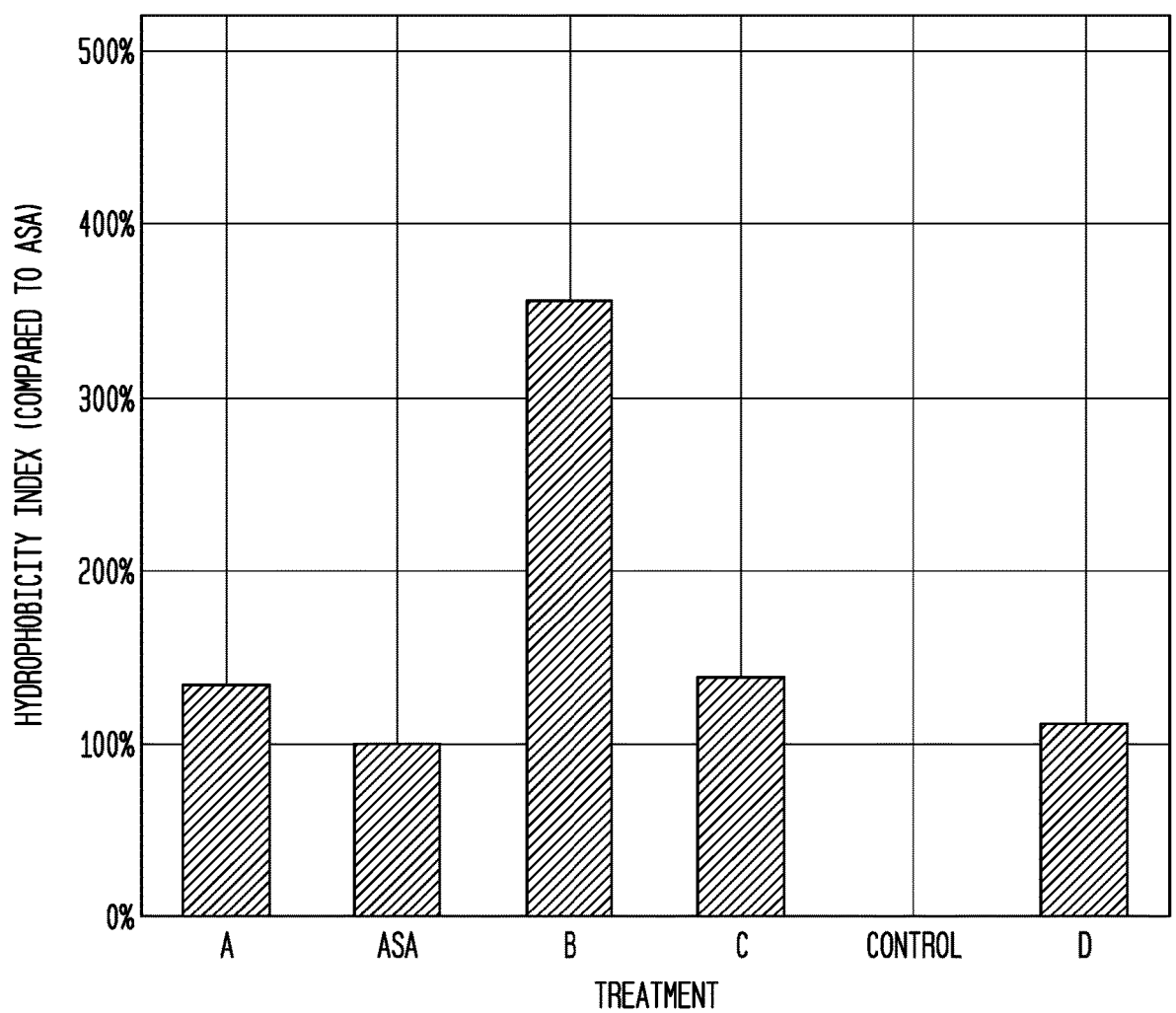
FIG. 10 is a histogram of Hydrophobicity Index of various samples of sized paper.

For Sample E, ASA: 1+[(1.84/0.281) −(1.84/0.281)]/(1.84/0.281)=1.00 or 100%
For Sample B: 1+[(1.84/0.281) −(0.36/0.196)]/(0.36/0.196)=3.56 or 356%
Results appear in FIG. 10.

The sample showing the greatest resistance to water uptake was the isoprene-isobutylene random copolymer reacted with maleic anhydride (IP-PIBSA) with 3.5× or 350% higher hydrophobicity index than standard ASA. This is indeed a very useful and unexpected result. PIBSA, the homopolymer of PIB reacted with maleic anhydride with or without Genapol, showed similar hydrophobicity indices which were about 30% higher than ASA. The PIB only, without the maleic anhydride reaction, showed hydrophobicity most similar to that of the ASA, showing that the succinic anhydride group on the PIB or the isoprene-PIB is preferred for bonding to the paper and thus hydrophobicity of the paper after sizing. The rank of sizing agents with increasing efficacy (hydrophobicity) is therefore:

ASA <PIBSA 450<<5% IP-PIBSA

Synthesis procedure for Unsaturated Polyester:

In a three neck round bottom flask polyisobutylene succinic anhydride (1 mol), phthallic anhydride (1 mol) and propylene glycol (2.1 mol) was added. Mixture was heated to 200° C. with continuous stirring for 12 hrs. After the completion of condensation reaction temperature was reduced to 150° C. and 200 mg of hydroquinone was added in the polyester resin and diluted with 35-40 wt % of styrene. Usually, methyl ethyl ketone or benzoyl peroxide is used as initiator to cure the polymer. The polyester resins and the styrene solvents react together to crosslink and form the solid resins. Polyester resins are formulated with inorganic filler for various applications.

Maleic Anhydride or (PIBSA)+phthallic anhydride+1,3 propane glycol→Polyester:

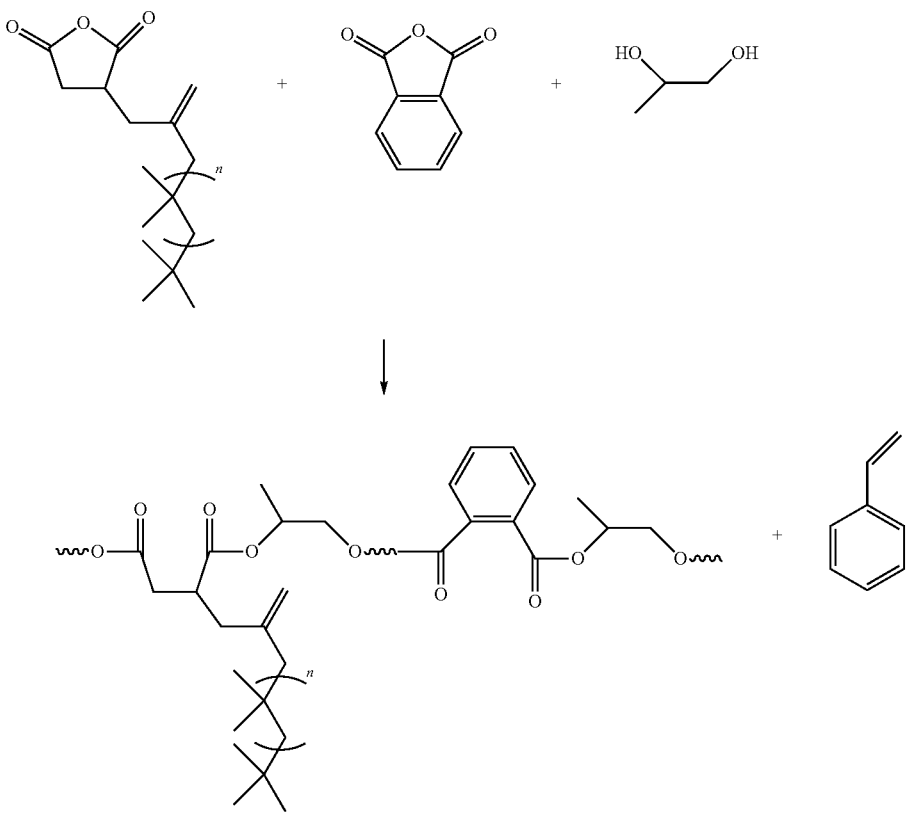

Polyester+Styrene yields the polyester/styrene resins. See Bharat Dholakiya (2012). Unsaturated Polyester Resin for Specialty Applications, Polyester, Dr. Hosam El-Din Saleh (Ed.), InTech, DOI: 10.5772/48479. Available from: https:// www.intechopen.com/books/polyester/unsaturated-polyester-resin-for-specialty-applications, as of Aug. 2, 2017 (Chapter 7). See also U.S. Pat. No. 4,698,411.

Examples 28-35 for Synthesizing Unsaturated Polyesters

The following polyester resins are readily prepared by way of the above procedure:

TABLE 9

Unsaturated Polyester Compositions

| Example | Maleic Anhydride | PIBSA (450) | PIB-IPSA (450) | PTHA | 1,3 propane glycol | Polystyrene (30% by wt.) |
|---|---|---|---|---|---|---|
| 28 | yes | No | No | yes | yes | yes |
| 29 | yes | yes | No | No | yes | yes |
| 30 | 50% | 50% | No | yes | yes | yes |
| 31 | No | Yes | No | Yes | yes | yes |
| 32 | 50% | No | 50% | yes | yes | yes |
| 33 | 50% | No | 50% | No | yes | yes |
| 34 | Yes | No | Yes | No | yes | yes |
| 35 | yes | No | Yes | yes | yes | yes |

In the above Table, PIB SA (450) refers to isobutylene homopolymer based anhydride and PIB-IPSA (450) refers to isobutylene/isoprene copolymer based anhydride, wherein the molecular weight of the copolymer, Mn, is 450 Daltons. It will be appreciated from the foregoing that an unsaturated polyester resin may be synthesized to incorporate a low molecular weight polyisobutylene homopolymer or oligomer having a number average molecular weight, Mn, of less than 800 Daltons, suitably 750 Daltons or less. This is conveniently provided by incorporating succinic anhydrides of oligomers such as triisobutylene or tetraisobutylene during preparation of the resins.

Examples 36-38 for Crosslinking Unsaturated Polyesters

To an unsaturated polyester of maleic anhydride, phthalic anhydride, and 1,3 propylene glycol of the class of Example 28 (with styrene), 10 weight % of polyisobutylene isoprene copolymer (Mn~450), 0.2% of cobalt napthenate, 1-2% of MEKP and 0.5% of diethyl aniline was added and mixed to make a homogenous solution at room temperature. Subsequently, the resin mixture was cured in an oven at 90 degree Celsius overnight. A similar experiment was performed with polyisobutylene para-methyl styrene copolymer (Mn~450). It was found that cured resin with added polyisobutylene isoprene copolymer or polyisobutylene para-methyl styrene copolymer had better mechanical properties (such as izod impact, flexural strength and shrinkage property of resins) than those without added polyisobutylene copolymer. Similar results are seen with low molecular weight PIB copolymer.

To an unsaturated polyester of maleic anhydride, phthalic anhydride, and 1,3 propylene glycol utilized in Example 36, 10 weight % of polyisobutylene homopolymer (Mn~450), 0.2% of cobalt napthenate, 1-2% of MEKP and 0.5% of diethyl aniline was added and mixed to make a homogenous solution at room temperature. Subsequently, the resin mixture was cured in an oven at 90 degree Celsius for overnight. A similar experiment was performed with and without addition of polyisobutylene (Mn~450). It was found that cured resin with added polyisobutylene had better mechanical properties (Izod impact, flexural strength and shrinkage of the resins) then the one without added polyisobutylene.

In another experiment, when more than 10 wt. % of polyisobutylene copolymer was used, it led to separation of two layers during curing. Polyisobutylene or polyisobutylene copolymer is preferably employed at relatively low levels, wherein the PIB polymer also acts as a as plasticizer in the resins. Depending upon the solubility of the PIB polymer or PIB copolymer in the medium, the amount of PIB polymer or copolymer employed in an unsaturated polyester resin may be higher or lower considering the solubility of the PIB polymer or PIB copolymer; typically in the range of from 5% to 20% of the solids present.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of illustration only and is not intended to limit the invention.

What is claimed is:

1. A method of making a non-random isobutylene copolymer comprising:
   (a) providing a reaction mixture to a first reactor comprising isobutylene monomer as well as a Lewis acid polymerization catalyst;
   (b) polymerizing the reaction mixture in the first reactor while maintaining the first reactor at a temperature above −30° C. and utilizing a first reactor residence time of less than 45 minutes to polymerize at least 30% of the isobutylene monomer fed to the first reactor to produce an isobutylene prepolymer in a polymerization mixture;
   (c) feeding the polymerization mixture to a second reactor along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst, wherein the molar ratio of isobutylene monomer fed to the first and second reactors to the comonomer is from 60:1 to 1:1;
   (d) polymerizing the polymerization mixture and comonomer in the second reactor while maintaining the reactor at a temperature above −30° C. and utilizing a reactor residence time of less than 45 minutes to produce a non-random crude isobutylene copolymer in a copolymerization mixture; and
   (e) recovering a purified non-random isobutylene copolymer from the copolymerization mixture having a molecular weight, Mn, of from 200 to 20,000 Daltons.

2. The method according to claim 1, wherein the first and second reactors are selected from loop reactors, CSTRs and plug flow reactors.

3. A method of making a non-random isobutylene copolymer comprising:
   (a) feeding a pre-formed isobutylene homopolymer or oligomer having from 2 to 40 repeat units to a reactor along with a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene and optionally additional Lewis acid polymerization catalyst and a diluent;
(b) polymerizing the polymer and comonomer mixture in the reactor while maintaining the reactor at a temperature above −30° C. and utilizing a reactor residence time of less than 45 minutes to produce a non-random crude isobutylene copolymer in a copolymerization mixture; and
(c) recovering a purified non-random isobutylene copolymer from the copolymerization mixture having a molecular weight, Mn, of from 200 to 20,000 Daltons; wherein the molar ratio of isobutylene repeat units to comonomer repeat units in the non-random copolymer is from 60:1 to 1:1.

4. The method according to claim 1, wherein the reactor(s) are maintained at a temperature of 0° C. or above.

5. The method according to claim 4, wherein the reactor(s) are maintained at a temperature of 5° C. or above.

6. The method according to claim 1, utilizing reactor residence times of 20 minutes or less.

7. The method according to claim 1, wherein the conversion of comonomer is from 45% to 80%.

8. The method according to claim 1, wherein the Lewis Acid polymerization catalyst comprises $BF_3$ and an alcohol co-catalyst.

9. The method according to claim 1, wherein the molar ratio of isobutylene to the one or more comonomers added to the system is from 12:1 to 1:1.

10. The method according to claim 1, wherein the purified non-random isobutylene copolymer has a molecular weight, Mn, of from 200 to 3000 Daltons.

11. The method according to claim 1, wherein the comonomer is a diene monomer and the purified non-random isobutylene copolymer has, on average, from 1.25 to 5 double bonds per molecule.

12. The method according to claim 1, wherein the comonomer is a diene monomer and the purified non-random isobutylene copolymer has, on average, from 0.85 to 2 vinylidene double bonds per molecule.

13. The method according to claim 1, wherein the comonomer is a diene monomer and the purified non-random isobutylene copolymer has, on average, from 1.2 to 1.8 vinylidene double bonds per molecule.

14. An isobutylene non-random copolymer comprising repeat units derived from isobutylene and a comonomer selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene, characterized in that the non-random copolymer exhibits a Tg at least 3.5° C. lower than a like random copolymer polymerized from the same monomer composition.

15. The isobutylene non-random copolymer according to claim 14, wherein the non-random copolymer exhibits a Tg of from 3.5° C. to 20° C. lower than a like random copolymer polymerized from the same monomer composition.

16. The isobutylene non-random copolymer according to claim 14, wherein the comonomer comprises isoprene.

17. The isobutylene non-random copolymer according to claim 14, wherein the comonomer comprises para methyl styrene or alpha methyl styrene.

18. The isobutylene non-random copolymer according to claim 14, wherein the comonomer comprises butadiene, cyclopentadiene, dicyclopentadiene, limonene, substituted styrenes other than alpha or para methyl styrenes, piperylene and C4 to C10 dienes other than isoprene, butadiene, cyclopentadiene, dicyclopentadiene, limonene or piperylene.

19. The isobutylene non-random copolymer according to claim 14, wherein the molar ratio of isobutylene-derived repeat units to the comonomer-derived repeat units is from 30:1 to 3:1.

20. The isobutylene non-random copolymer according to claim 14, wherein the molar ratio of isobutylene-derived repeat units to the comonomer-derived repeat units is from 12.5:1 to 3:1.

* * * * *